United States Patent [19]
Oshidari

[11] Patent Number: 5,194,055
[45] Date of Patent: Mar. 16, 1993

[54] PLANETARY GEAR TYPE TRANSMISSION MECHANISM

[75] Inventor: Toshikazu Oshidari, Yokosuka, Japan

[73] Assignee: Nissan Motor Co., Ltd., Japan

[21] Appl. No.: 853,191

[22] Filed: Mar. 18, 1992

[30] Foreign Application Priority Data

Mar. 19, 1991 [JP]   Japan ................................. 3-80664

[51] Int. Cl.$^5$ ............................................. F16H 57/10
[52] U.S. Cl. ..................................... 475/281; 475/280
[58] Field of Search .......................... 475/276, 280, 281

[56] References Cited

U.S. PATENT DOCUMENTS

| | | | |
|---|---|---|---|
| 3,877,320 | 4/1975 | Iijima | 475/280 |
| 4,653,348 | 3/1987 | Hiraiwa | 475/276 |
| 5,133,697 | 7/1992 | Hattori | 475/281 X |
| 5,135,444 | 8/1992 | Hattori | 475/289 X |

FOREIGN PATENT DOCUMENTS

| | | | |
|---|---|---|---|
| 64-30950 | 2/1989 | Japan . | |
| 2-129447 | 5/1990 | Japan | 475/280 |
| 2-256944 | 10/1990 | Japan | 475/280 |

*Primary Examiner*—Leslie A. Braun
*Assistant Examiner*—Benjamin Levi
*Attorney, Agent, or Firm*—Lowe, Price, LeBlanc & Becker

[57] ABSTRACT

A planetary gear type transmission mechanism reduces frictional resistance at all forward speed ratio. The transmission mechanism includes an input shaft, an output shaft, a first planetary gear set, a second planetary gear set and a friction means. The friction means includes a plurality of friction elements for determining power transmission route through at least one of the first and second planetary gear sets for establishing a plurality of forward speed ratios. At any forward speed ratio all gear elements of the first and second planetary gear sets except for the gear elements integrally coupled with the output shaft rotate in the same direction as that of the input shaft at speed less than the input shaft.

14 Claims, 25 Drawing Sheets

| Gear Position \ Friction Element | C1 | C2 | C3 | B1 | B2 | B3 | Speed Ratio |
|---|---|---|---|---|---|---|---|
| Forward 1st | ○ | | | | ○ | | $\frac{1+a_2}{a_2}$ |
| Forward 2nd | | ○ | | | ○ | | $\frac{1-a_1+a_2-a_1 \cdot a_2}{1-a_1-a_1 \cdot a_2}$ |
| Forward 3rd | | ○ | | | | ○ | $1+a_2$ |
| Forward 4th | | ○ | ○ | | | | $1$ |
| Forward 5th | | | ○ | | | ○ | $1-a_1+a_2-a_1 \cdot a_2$ |
| Reverse | ○ | | | | ○ | | $-\frac{a_1+a_1 \cdot a_2}{1-a_1-a_1 \cdot a_2}$ |

$a_1$: Gear Ratio of Internal Ring Gear R1 and Sun Gear S1

$a_2$: Gear Ratio of Internal Ring Gear R2 and Sun Gear S2

FIG_3
PRIOR ART
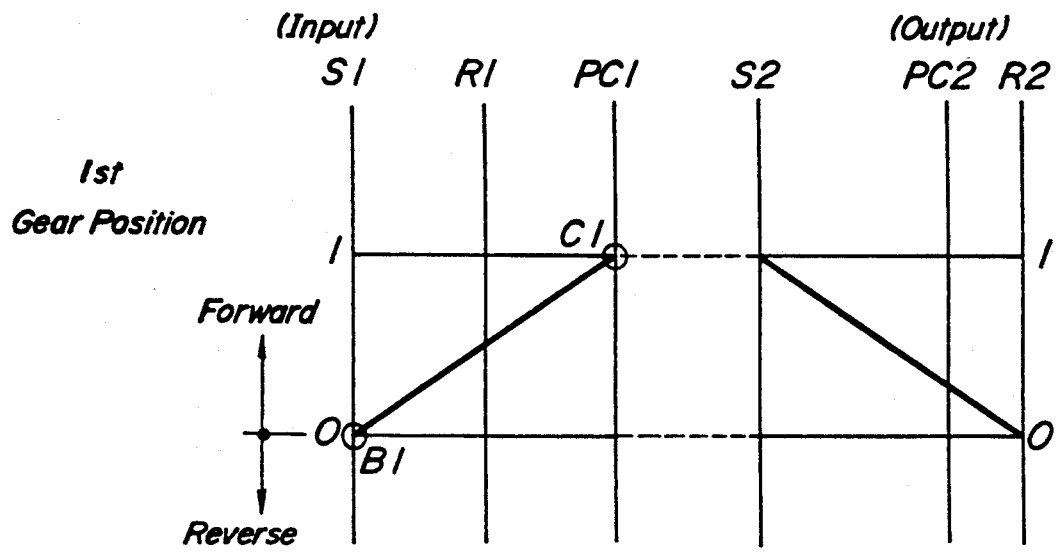
FIG_4
PRIOR ART
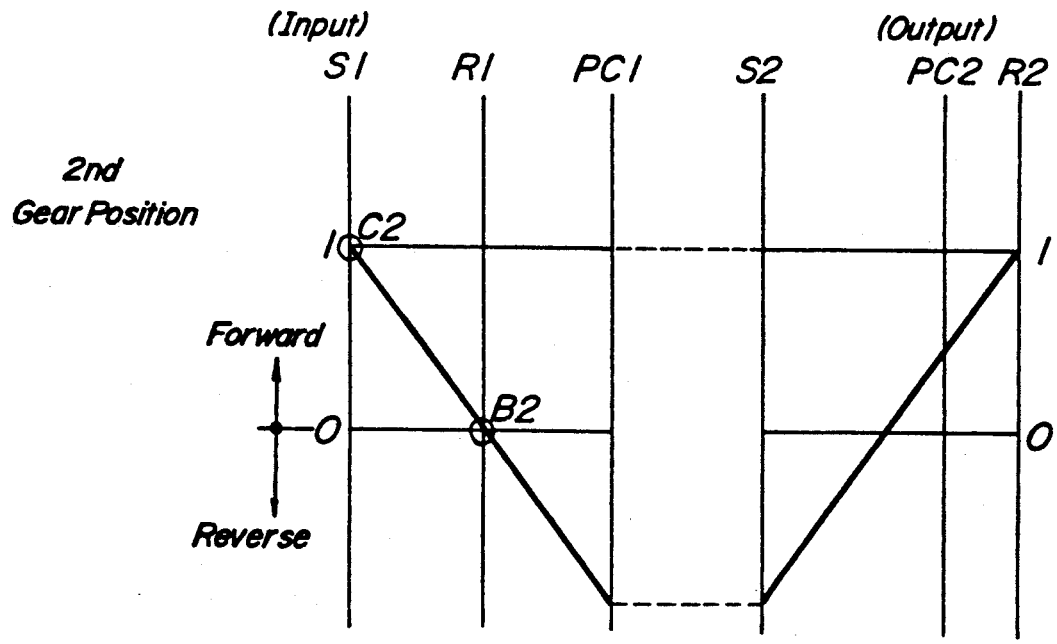

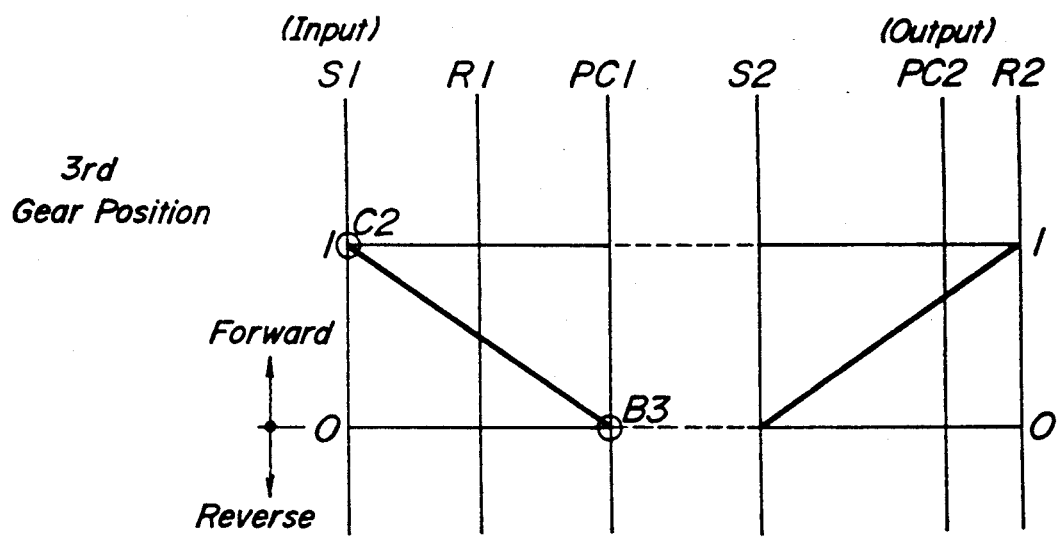
FIG_5
PRIOR ART
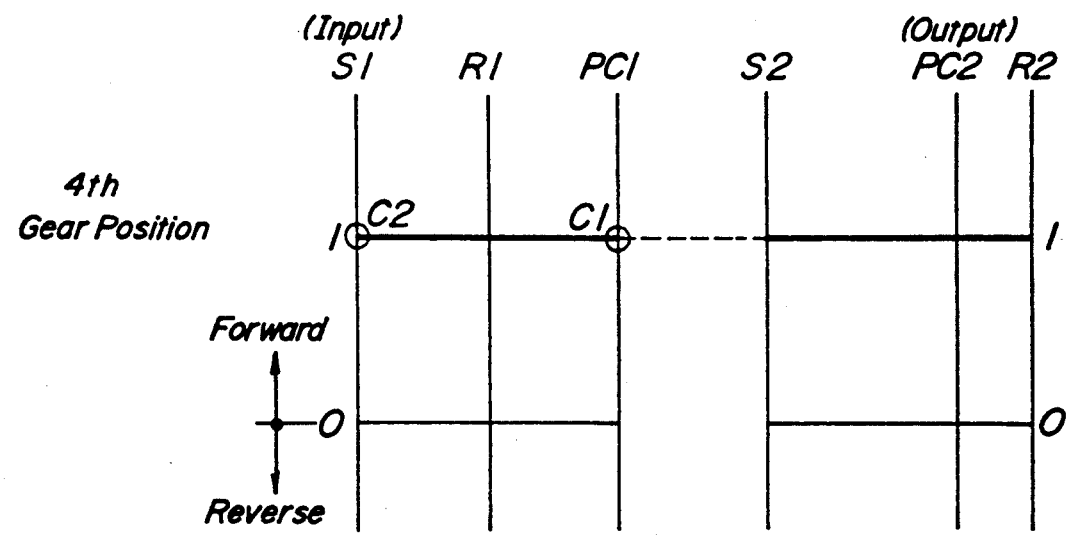
FIG_6
PRIOR ART

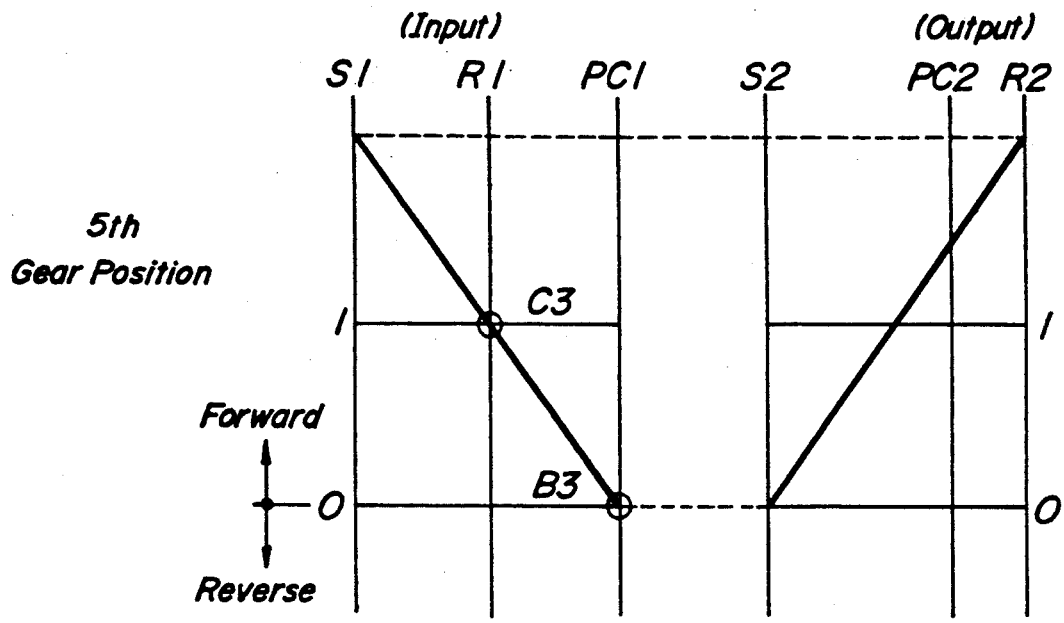
FIG_7
PRIOR ART
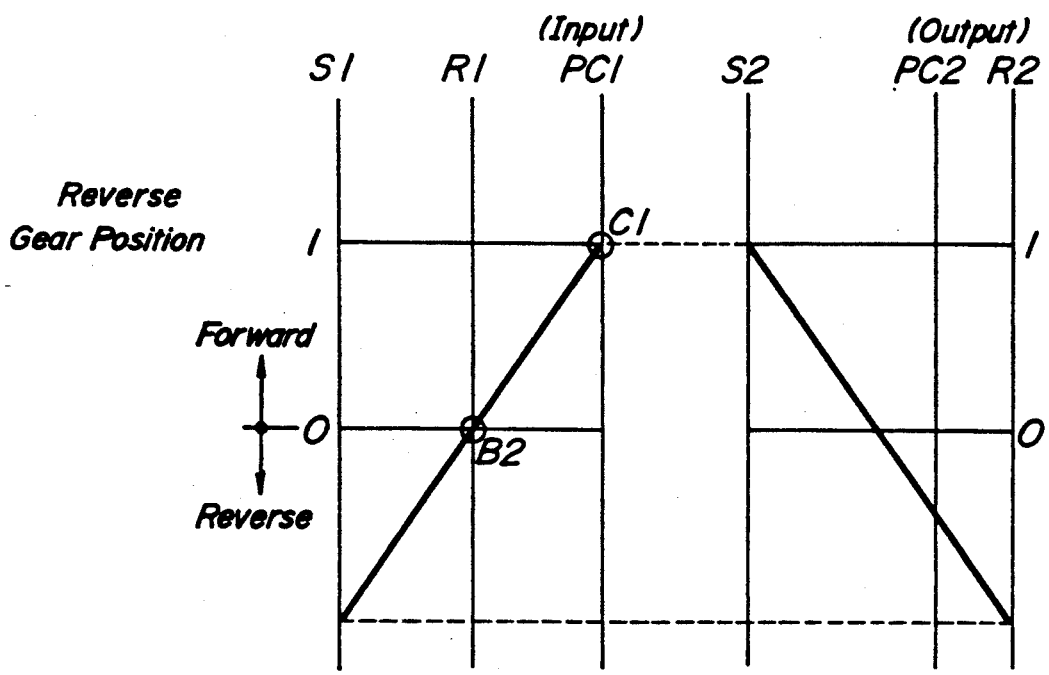
FIG_8
PRIOR ART

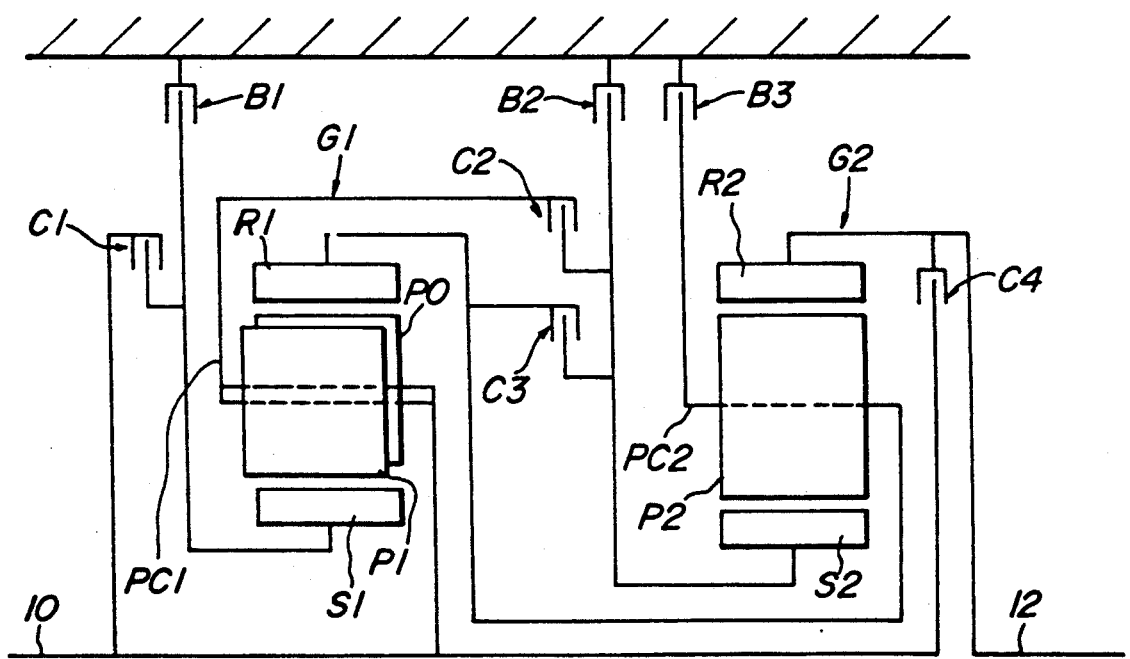
FIG_9

| Friction Element / Gear Position | | C1 | C2 | C3 | C4 | B1 | B2 | B3 | Speed Ratio | |
|---|---|---|---|---|---|---|---|---|---|---|
| Forward | 1st | | ○ | | | ○ | | | 1/(1-a1-a1·a2) | 3.05 |
| | 2nd | | | ○ | | ○ | | | 1/(1-a1) | 1.92 |
| | 3rd | | | | ○ | | ○ | | 1/(1-a1)(1+a2) | 1.37 |
| | 4th | | | | ○ | ○ | | | 1 | 1.00 |
| | 5th | ○ | | | | ○ | | | 1/(1+a2) | 0.714 |
| | (4th) | ○ | ○ | | | | | | 1 | 1.00 |
| Reverse | | | ○ | | | | | ○ | -1/a2 | -2.50 | a1 = 0.48 : Gear Ratio of Internal Ring Gear R1 and Sun Gear S1 in G1
a2 = 0.4 : Gear Ratio of Internal Ring Gear R2 and Sun Gear S2 in G2

FIG_12
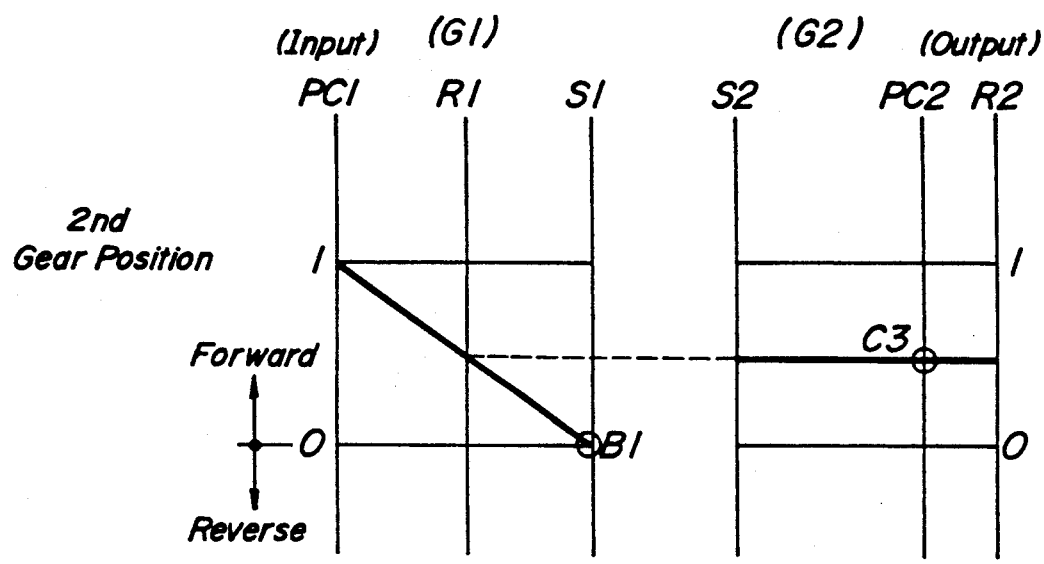
FIG_13
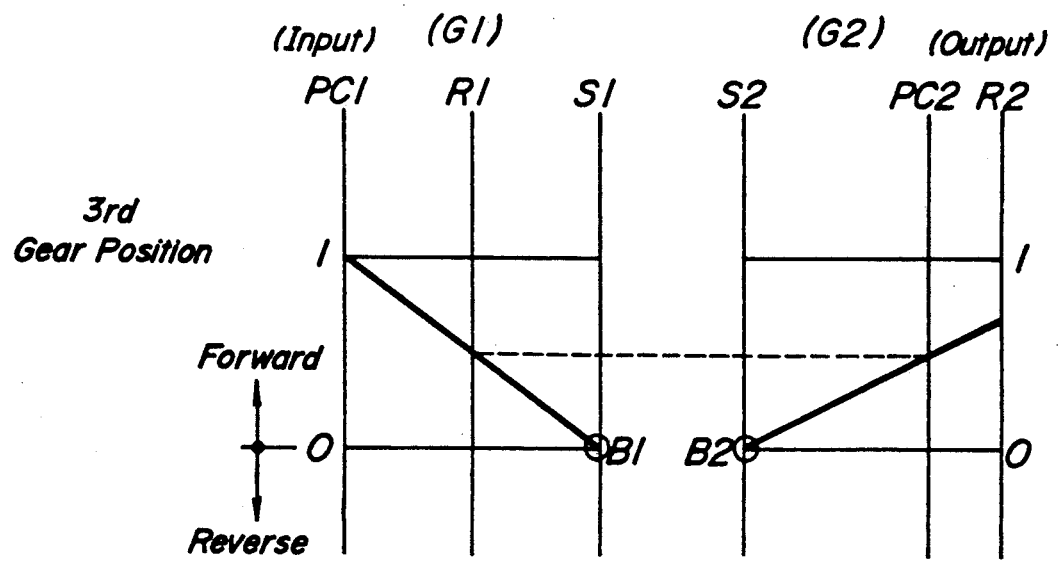

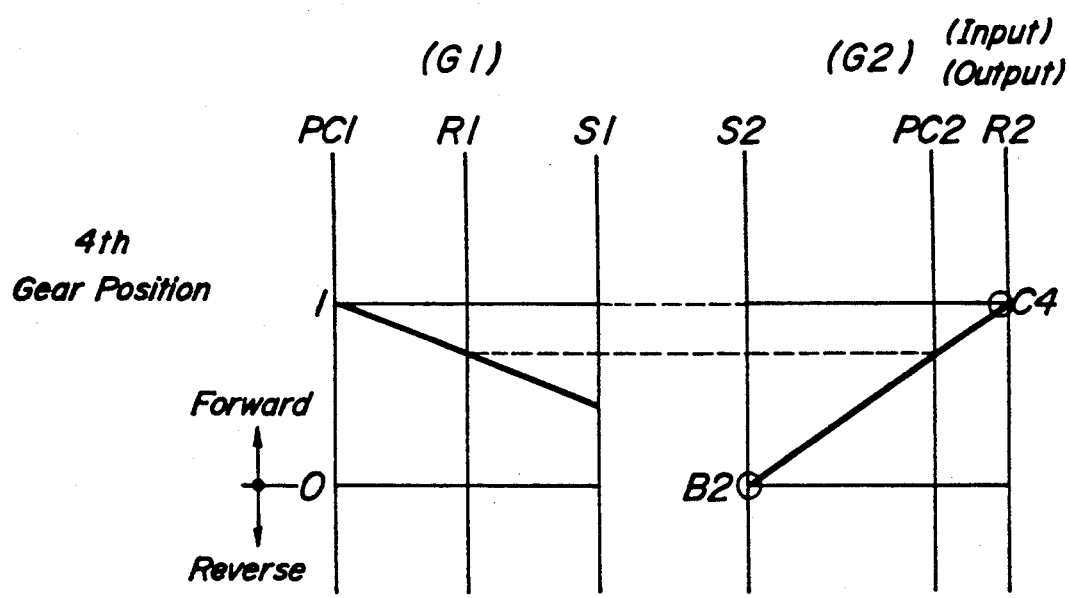
FIG_14
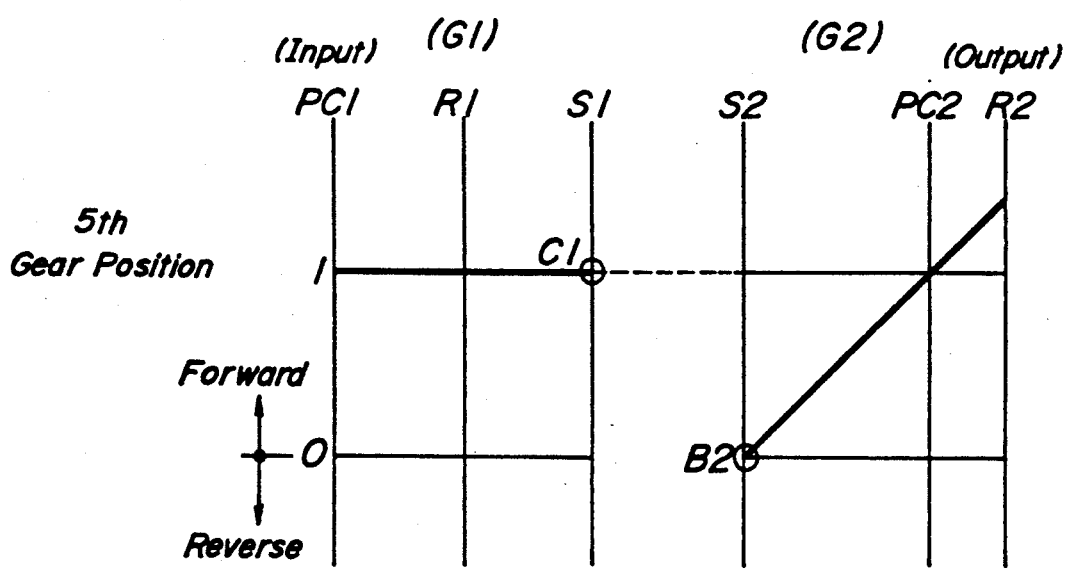
FIG_15

FIG._16
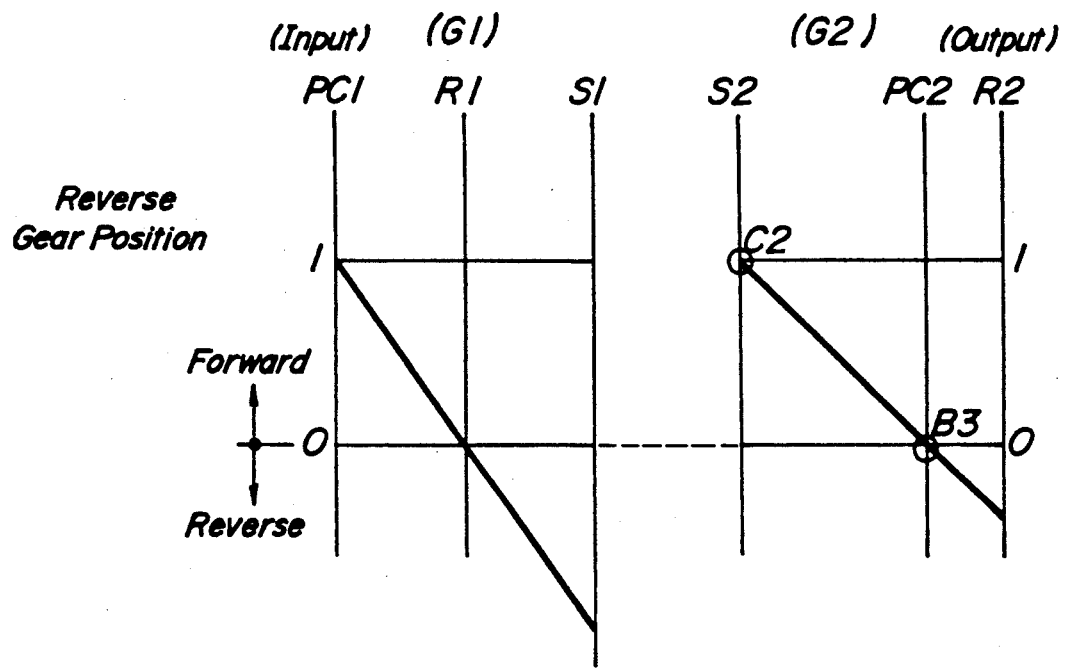
FIG._17
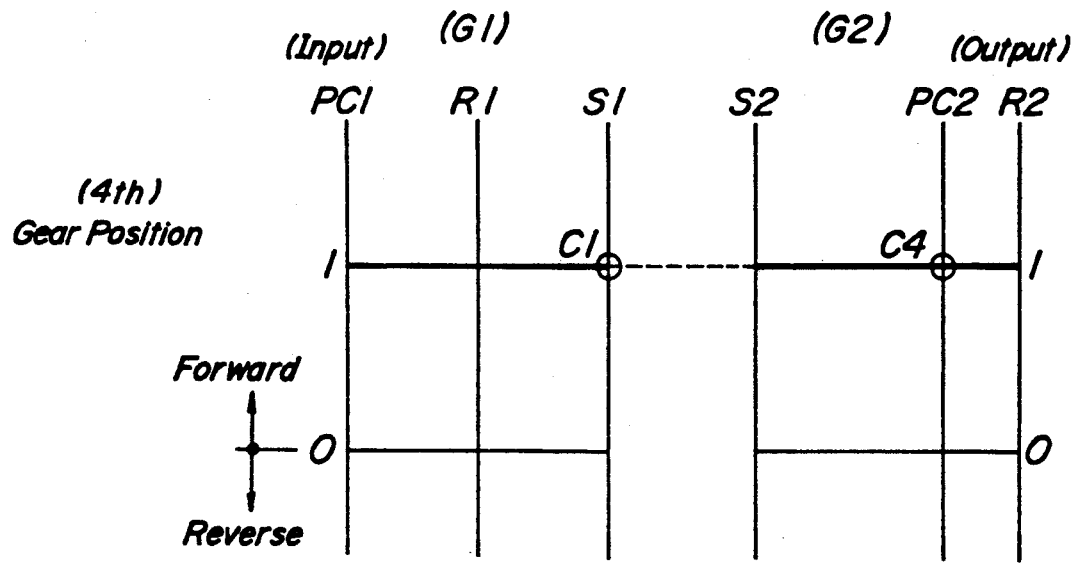

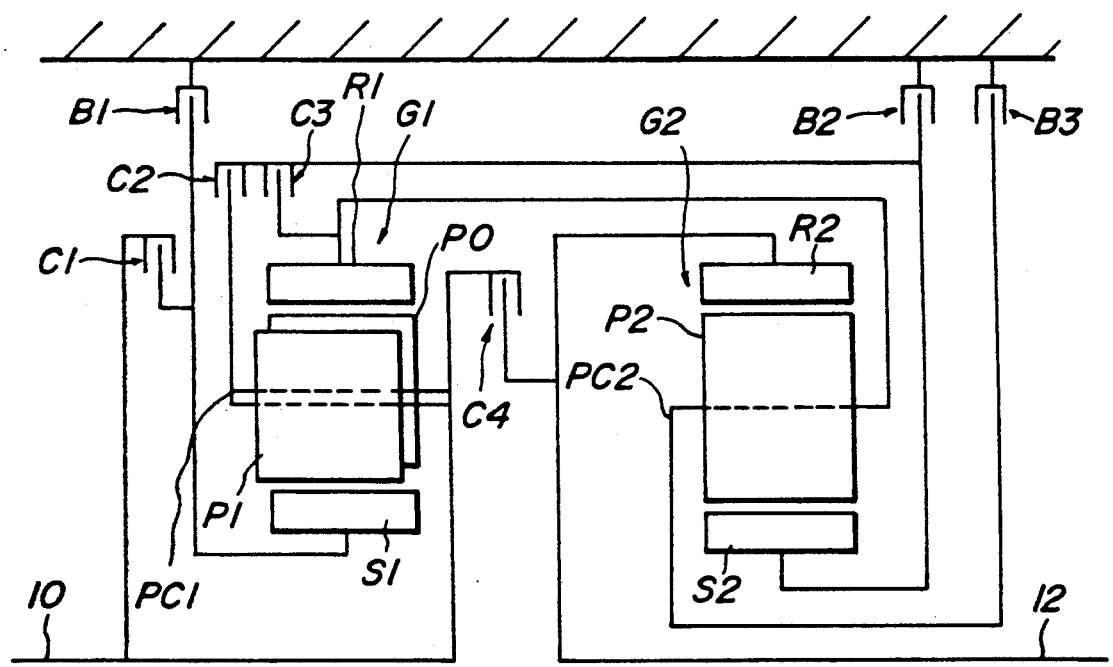
FIG_18

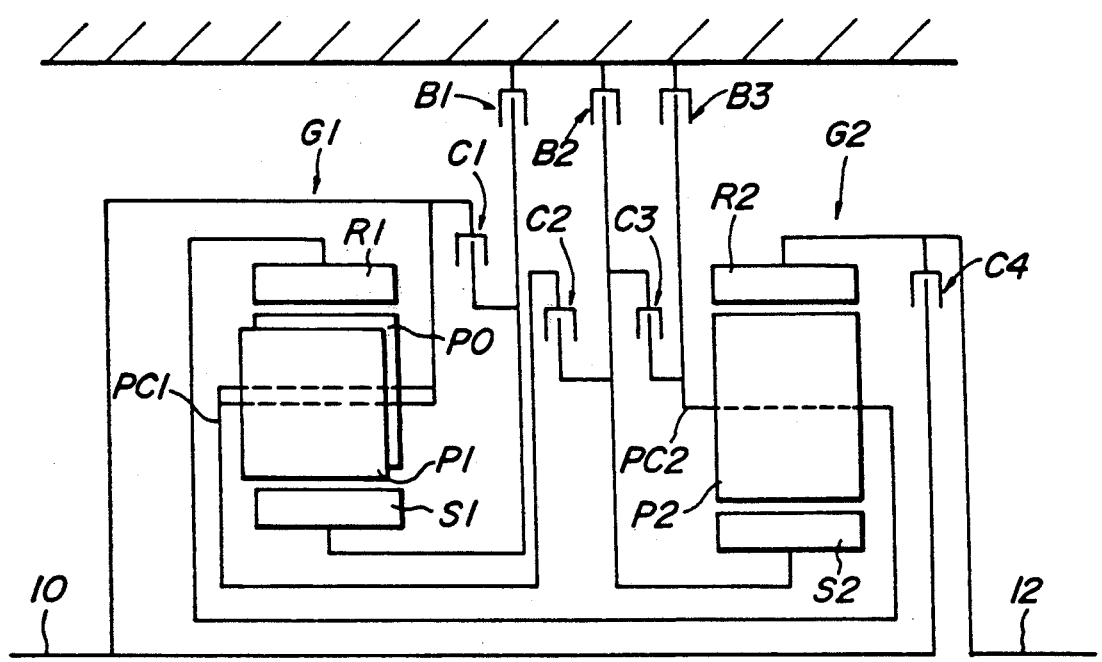
FIG_19

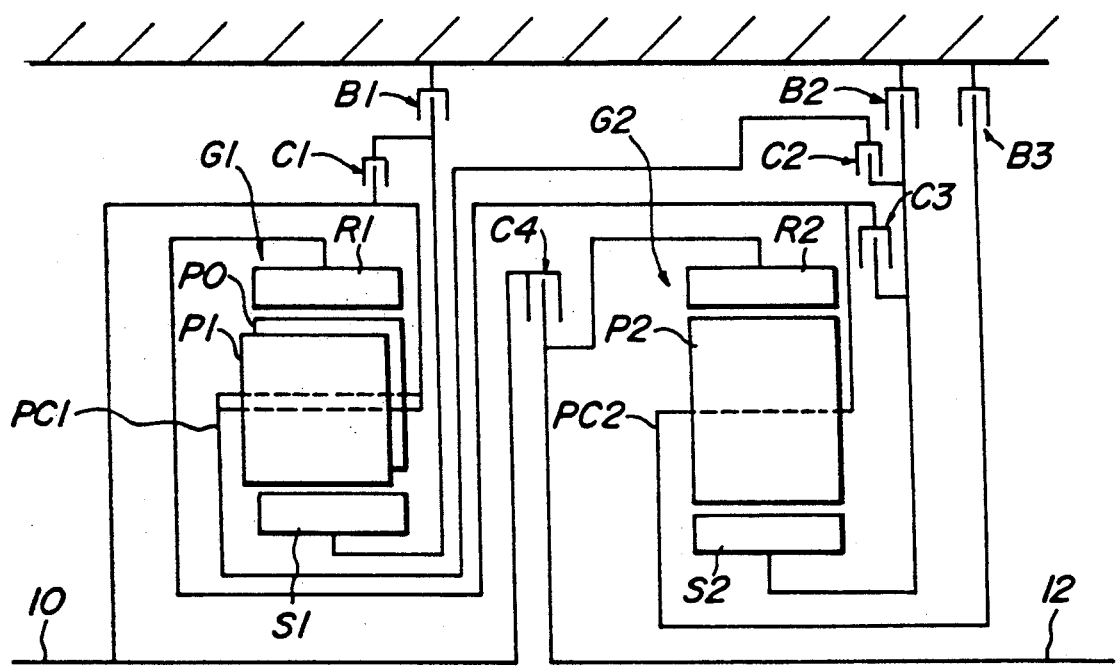
FIG_20

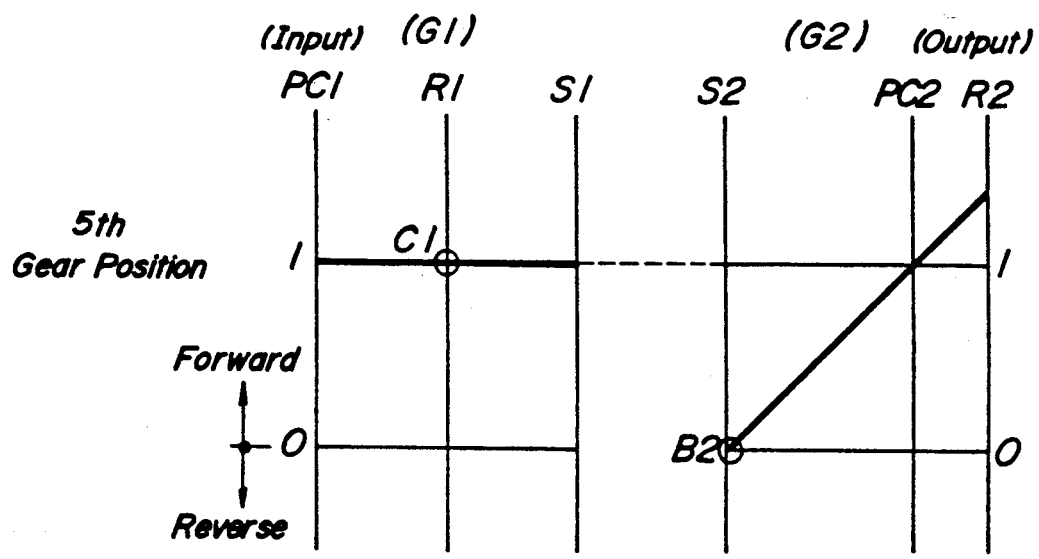
FIG._27
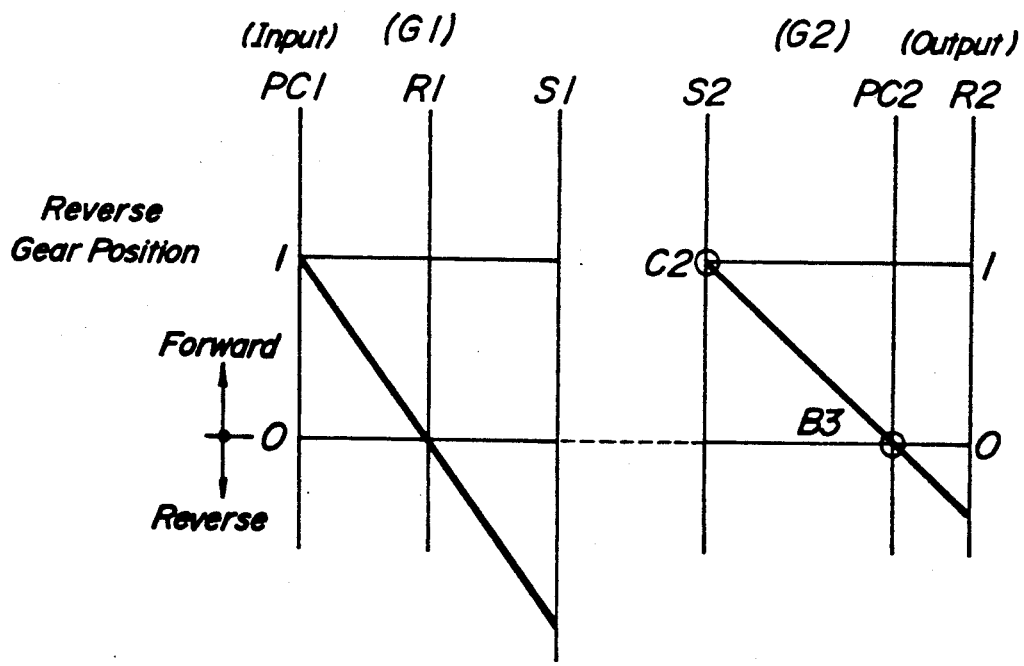
FIG._28

| Gear Position | Friction Element | C1 | C2 | C3 | C4 | B1 | B2 | B3 | OWC |
|---|---|---|---|---|---|---|---|---|---|
| Forward | 1st |  | ◉ |  |  | ○ |  |  | ○ |
|  | 2nd |  |  | ○ |  | ○ |  |  |  |
|  | 3rd |  |  |  | ○ | ○ |  |  |  |
|  | 4th | ○ |  |  | ○ |  |  |  |  |
|  | 5th | ○ |  |  |  |  | ○ |  |  |
| Reverse |  |  | ○ |  |  |  |  | ○ |  |

◉ Effective for Engine Braking

FIG_37
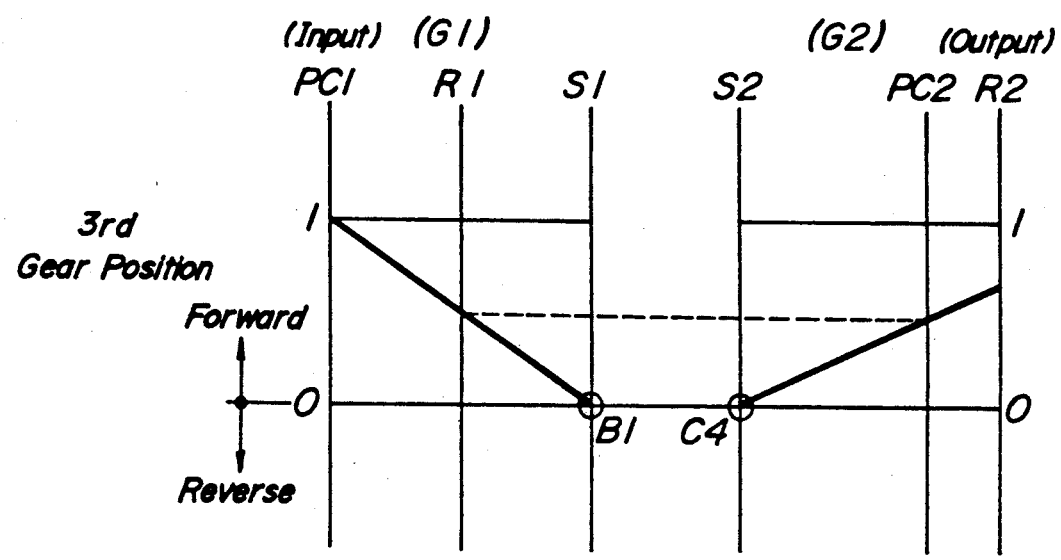
FIG_38
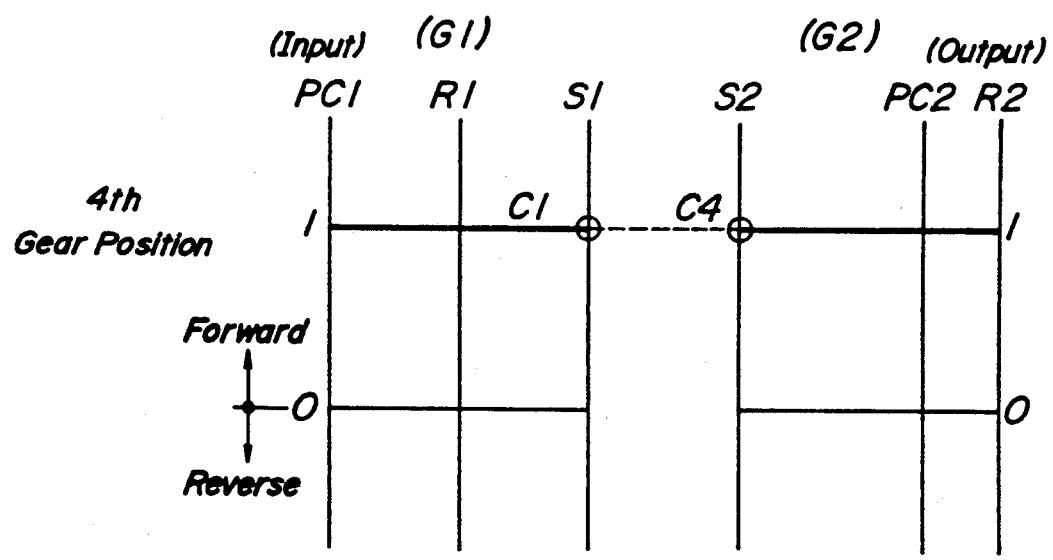

PLANETARY GEAR TYPE TRANSMISSION MECHANISM

BACKGROUND OF THE INVENTION

1. Field of the Invention

The present invention relates to a planetary gear type transmission mechanism, for example, to be used for an automatic transmission.

2. Description of the Related Art

Japanese Patent Application Laid Open No. 64-30950 discloses a planetary gear type transmission mechanism, in which two pairs of planetary gear sets are employed for establishing forward five speed ratios. In the disclosed transmission mechanism, one of the planetary gear sets is constructed in a double pinion type, in which two planet pinion gears meshing with each other are provided. The other of the planetary gear sets is constructed in a single pinion type, in which a single planet pinion is employed.

The disclosed conventional transmission mechanism is shown in FIG. 1 by skeleton diagram. As seen in this FIG. 1, the double pinion type planetary gear set G1 includes a first sun gear S1, a first internal ring gear R1, and a pinion carrier PC1 rotatably supporting first outer and inner planet pinion gears P0, P1. The first outer planet pinion gears P0 meshes with the first internal ring gear R1 and the first inner planet pinion gears P1 meshes with the first sun gear S1.

On the other hand, the single pinion type planetary gear set G2 includes a second sun gear S2, a second internal ring gear R2, and a second pinion carrier rotatably supporting second planet pinion gears P2 meshed with the gears S2 and R2.

The planetary gear sets G1 and G2 are related to each other and to an input and output shafts 10 and 12 through three clutches C1, C2 and C3 and three brakes B1, B2 and B3 as shown in FIG. 1. The engaging actuation of these clutches and brakes with the combination shown in FIG. 2 (refer to "○" marks) provides the corresponding five forward gear positions and one reverse gear position, since the first pinion carrier PC1 and the second sun gear S2 are coupled with each other to form a first rotating unity and the first sun gear S1 and the second internal ring gear R2 are coupled with each other to form a second rotating unity.

In the foregoing construction, the relationship among rotation speed ratios of constructional gear elements of the both planetary gear sets to the input shaft is as shown in FIGS. 3 to 8 at each gear positions, i.e. the first, second, third, fourth and fifth gear positions for forward and the reverse gear position. FIGS. 3 to 8 are alignment charts in which constructional gear elements of each planetary gear set are positioned horizontally according to the gear ratio of the internal ring gear teeth number and the sun gear teeth number, a line extending across the vertical axes corresponding to the constructional gear elements of the planetary gear set represents the rotation speed ratio of each constructional gear element at the crossing points to the above vertical axes. Of course, the rotation speed ratio 0 represents the state in which the relevant constructional element is fixed, 1 represents the state, in which the relevant constructional element rotates in the same direction as that of the input shaft (forward direction) at the same speed as that of the input shaft, and the negative value represents the state, in which the relevant constructional element rotates in opposite direction to the input shaft (reverse direction).

Explaining, for example, the first gear position as shown in FIG. 3, the first sun gear S1 and the second internal ring gear R2 are fixed by engaging actuation of the first brake B1, the first pinion carrier PC1 and the second sun gear S2 are rotated forwardly at the same speed as input speed, i.e., the rotation speed of the input shaft 10 by engaging actuation of the first clutch C1. For the above, as appreciated from FIG. 3 the second pinion carrier PC2 is rotated forwardly, but remarkably reduced in rotation and this reduced rotation at output speed is delivered from the second pinion carrier PC2 to the output shaft 12 coupled therewith.

Such prior planetary gear type transmission mechanism described above has following problems.

At the second gear position as shown in FIG. 4, the first pinion carrier PC1 and the second sun gear S2 are driven to rotate at approximately the same speed as the input speed in opposite direction to the input rotation. Furthermore, at the fifth gear position as shown in FIG. 7, the first sun gear S1 and the second internal ring gear R2 are driven to rotate at a speed approximately twice of the input rotation. With such construction, because of presence of the elements driven in the opposite direction to the input rotation, and of presence of the elements rotating at high speed, friction plates arranged with small clearances within the clutches and brakes are rotated relatively to each other at high speed to increase in frictional resistance under disengage condition of the clutches and brakes. On the other hand, the elements rotating at high speed must be supported by bearings of sufficient strength for withstanding centrifugal force and for withstanding high speed rotation, which are accessibly expensive.

Furthermore, in the disclosed construction, at the fifth gear position of high frequency in use both of the planetary gear sets are used for power transmission as appreciated in FIG. 7. Such arrangement is not desirable because of possibility of causing gear noise and low power transmission efficiency. Particularly, since the fifth gear position is most frequently used at the normal vehicular driving condition, problem of the gear noise and the low power transmission efficiency is substantial.

SUMMARY OF THE INVENTION

It is an object of the present invention to solve the problems in the prior art.

Another object of the invention is to provide a planetary gear type transmission mechanism which can suppress gear noise and improve power transmission efficiency.

A further object of the invention is to provide a planetary gear type transmission mechanism which can eliminate any elements rotating in the opposite direction to the input rotation and any elements rotating at accessibly high speed over the input rotation, other than output element.

In order to accomplish above-mentioned and other objects, it is a first aspect of the invention, a planetary gear type transmission mechanism comprises:

an input member to be supplied rotation from a power supply;

an output member for delivering rotation changed in speed at an selected speed ratio;

a first gear set including a gear element constantly coupled with said input member for rotation therewith; and a second gear set including a gear element constantly coupled with said output member for rotation therewith;

friction means including a plurality of friction elements for determining power transmission route through at least one of said first and second gear sets for establishing a plurality of speed ratios between the input and output members;

other gear elements of the first and second gear sets being coupled with each other and the friction elements being arranged, in such manner that all gear elements of the first and second gear sets except for said gear element constantly coupled with the output member rotates in the same direction as that of the input member at speed less than the input member upon selection of any forward speed ratio.

In one example of the above planetary gear type transmission mechanism in accordance with the invention, it is preferred that the highest speed ratio of said forward speed ratios is established with the second gear set is exclusively active for transmitting rotation of the input member to the output member. The highest speed ratio is realized, for example, by connecting the gear element of the first gear set constantly coupled with the input member and any one of gear elements of the second gear set for direct power transmission of the input rotation to the second gear.

Such special construction, at the highest speed ratio most frequently used at normal vehicular driving condition, provides high power transmission efficiency, since the first gear set is not active for power transmission at all.

According to a second aspect of the invention, a planetary gear type transmission mechanism comprises:

an input shaft;
an output shaft;

a first planetary gear set including a first sun gear, a first internal ring gear, a first outer planet pinion gears and a first inner planet pinion gears meshed with each other, and a first pinion carrier rotatably supporting said first outer planet pinion gears and said first inner planet pinion gears, said first outer planet pinion gears each meshing with said first internal ring gear, said first inner planet pinion gears each meshing with said first sun gear, and said first pinion carrier being constantly coupled with said input shaft;

a second planetary gear set including a second sun gear, a second internal ring gear, a second planet pinion gears each meshing with both of said second sun gear and said second internal ring gear, and a second pinion carrier rotatably supporting said second planet pinion gears, and said second internal ring gear being constantly coupled with said output shaft; and a friction means including first, second, third and fourth clutches and first, second and third brakes, of which said first clutch connects and disconnects the unity of said input shaft and said first pinion carrier to and from said first sun gear for selected speed ratio, said second clutch connects and disconnects the unity of said input shaft and said first pinion carrier to and from said second sun gear for selected speed ratio, said third clutch connects and disconnects the unity of said first internal ring gear and said second pinion carrier to and from said second sun gear for selected speed ratio, said fourth clutch connects and disconnects the unity of said input shaft and said first pinion carrier to and from the unity of said output shaft and said second internal ring gear for selected speed ratio, said first brake connects and disconnects said first sun gear to and from a stationary member for selected speed ratio, said second brake connects and disconnects said second sun gear to and from the stationary member for selected speed ratio, and said third brake connects and disconnects the unity of said second pinion carrier and said first internal ring gear to and from the stationary member for selected speed ratio.

According to the invention, in the above planetary gear type transmission mechanism, said first clutch is altered to connect and disconnect the unity of said input shaft and said first pinion carrier to and from the unity of said first internal ring gear and said second pinion carrier for the selected speed ratio.

According to the invention, moreover, in the above planetary gear type transmission mechanism, said third clutch is altered to connect and disconnect the unity of said first internal ring gear and said second pinion carrier to and from the unity of said output shaft and said second internal ring gear for the selected speed ratio.

According to the invention, still moreover, in the above planetary gear type transmission mechanism, said fourth clutch is altered to connect and disconnect said first sun gear to and from said second sun gear for the selected speed ratio.

Preferably, all of the described planetary gear type transmission mechanism further comprises a one-way clutch arranged in series with said second clutch for easiness of shift between relevant speed ratios.

BRIEF DESCRIPTION OF THE DRAWINGS

FIG. 3 is an alignment chart at the first gear position for the above prior art;

FIG. 4 is an alignment chart at the second gear position for the prior art;

FIG. 5 is an alignment chart at the third gear position for the prior art;

FIG. 6 is an alignment chart at the fourth gear position for the prior art;

FIG. 7 is an alignment chart at the fifth (over-drive) gear position for the prior art;

FIG. 8 is an alignment chart at the reverse gear position for the prior art;

FIG. 9 is a skeleton diagram showing the first preferred embodiment of a planetary gear type transmission mechanism according to the present invention;

FIG. 12 is an alignment chart for the first preferred embodiment of the planetary gear type transmission mechanism at the second gear position;

FIG. 13 is an alignment chart for the first preferred embodiment of the planetary gear type transmission mechanism at the third gear position;

FIG. 14 is an alignment chart for the first preferred embodiment of the planetary gear type transmission mechanism at the fourth gear position;

FIG. 15 is an alignment chart for the first preferred embodiment of the planetary gear type mechanism transmission at the fifth gear position;

FIG. 16 is an alignment chart for the first preferred embodiment of the planetary gear type transmission mechanism at the reverse gear position;

FIG. 17 an alignment chart for the first embodiment of the transmission mechanism at the fourth ear position established by modified combination of the friction elements to be engaged;

FIG. 18 is a skeleton diagram showing the second embodiment of the planetary gear type transmission mechanism according to the invention;

FIG. 19 is a skeleton diagram showing the third embodiment of the planetary gear type transmission mechanism according to the invention;

FIG. 20 is a skeleton diagram showing the fourth embodiment of the planetary gear type transmission mechanism according to the invention;

FIG. 27 is an alignment chart for the sixth embodiment of the planetary gear type transmission mechanism at the fifth gear position;

FIG. 28 is an alignment chart for the sixth embodiment of the planetary gear type transmission mechanism at the reverse gear position;

FIG. 37 is an alignment chart for the eleventh embodiment of the planetary gear type transmission mechanism at the third gear position;

FIG. 38 is an alignment chart for the eleventh embodiment of the planetary gear type transmission mechanism at the fourth gear position;

DESCRIPTION OF THE PREFERRED EMBODIMENTS

Figures 1, 2:
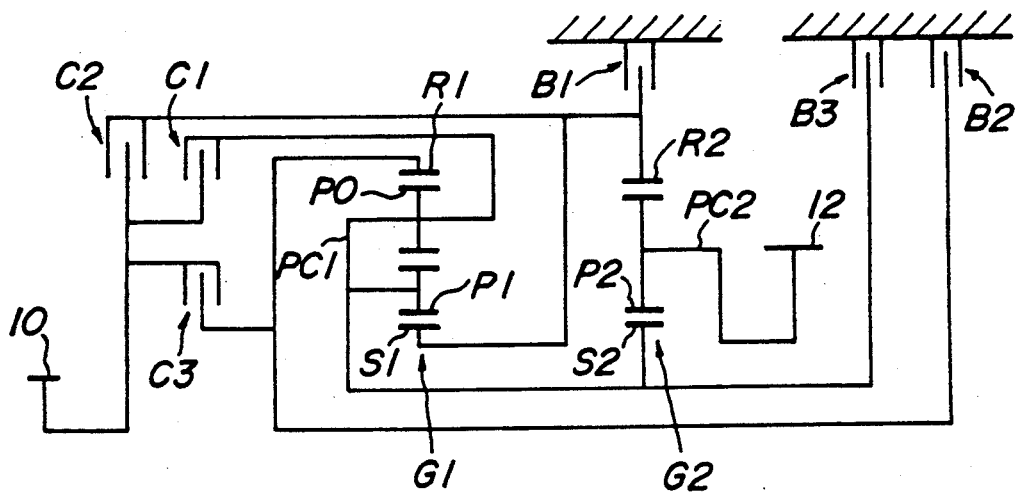
FIG. 1 is a skeleton diagram showing a prior art of a planetary gear type transmission mechanism.
FIG. 2 is a table showing relationship of friction elements to be engaged and gear positions established thereby as well as relevant speed ratios in the prior art in FIG. 1.

Referring now to the drawings, particularly to FIG. 9, the first embodiment of a planetary gear type transmission mechanism according to the present invention, includes an input shaft 10, an output shaft 12 coaxially arranged thereto, a first planetary gear set G1, a second planetary gear set G2, a first clutch C1, a second clutch C2, a third clutch C3, a fourth clutch C4, a first brake B1, a second brake B2 and a third brake B3.

The first planetary gear set G1 near the input shaft 10 is of a double pinion type construction which has a first sun gear S1, a first internal ring gear R1, and a first pinion carrier PC1 rotatably supporting first outer planet pinion gears P0 and first inner planet pinion gears P1 meshing with each other. The first outer planet pinion gears P0 are also meshed with the first internal ring R1. The first inner planet pinion gears P1 are also meshed with the first sun gear S1.

On the other hand, the second planetary gear set G2 near the output shaft 12 is of a single pinion type construction which has a second sun gear S2, a second internal gear R2, and a second pinion carrier PC2 rotatably supporting second planet pinion gears P2. The second planet pinion gears P2 are meshed with both of the second sun gear S2 and the second internal ring gear R2.

The first pinion carrier PC1 is normally coupled with the input shaft 10 to be constantly driven therewith by an output torque of a power supply, such as an automotive internal combustion engine. The second internal ring gear R2 is normally coupled with the output shaft 12 so as to deliver the output torque of the transmission mechanism to a final drive not shown through the output shaft 12. The first internal ring gear R1 and the second pinion carrier PC2 are integrally coupled with each other to be rotated as one unity.

The first clutch C1 is adapted to connect and disconnect the unity of the input shaft 10 and the first pinion carrier PC1 to and from the first sun gear S1. The second clutch C2 is adapted to connect and disconnect the unity of the input shaft 10 and the first pinion carrier PC1 to and from the second sun gear S2. The third clutch C3 is adapted to connect and disconnect the unity of the first internal ring gear R1 and the second pinion carrier PC2 to and from the second sun gear S2. The fourth clutch C4 is adapted to connect and disconnect the unity of the input shaft 10 and the first pinion carrier PC1 to and from the unity of the output shaft 12 and the second internal ring gear R2.

The first brake B1 is adapted to fix and release the first sun gear S1 to and from a stationary member, i.e., transmission casing. The second brake B2 is adapted to fix and release the second sun gear S2 to and from the stationary member. The third brake B3 is adapted to fix and release the unity of the second pinion carrier PC2 and the first internal ring gear R1 to and from the stationary member.

Figures 10, 11:
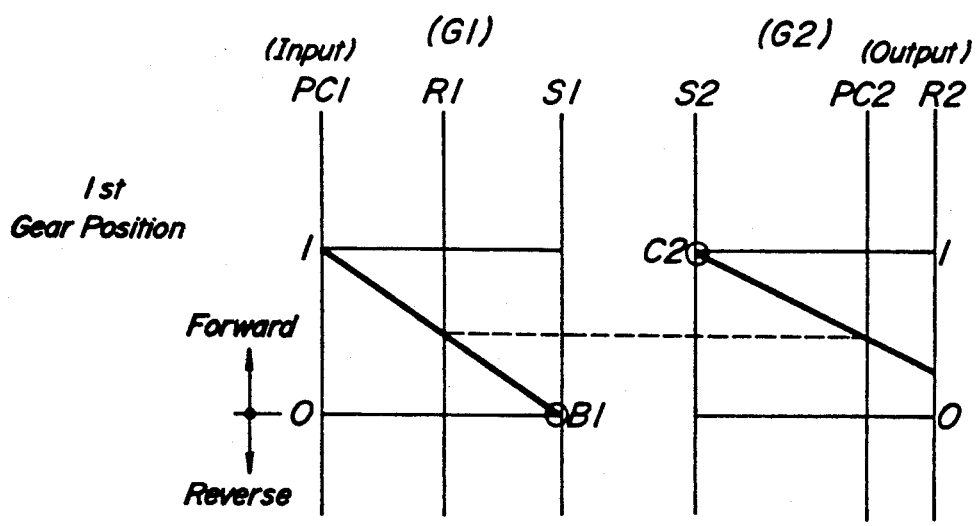
FIG. 10 is a table showing relationship between friction elements to be engaged and gear positions established thereby as well as relevant speed ratios in the construction as shown in FIG. 9.
FIG. 11 is an alignment chart for the above first example at the first gear position.

In the described first embodiment of the planetary gear type transmission mechanism, forward five gear positions and a reverse gear position of corresponding speed ratios can be established by selectively operating the clutches C1, C2, C3 and C4 and the brakes B1, B2 and B3 as shown in FIG. 10 by "○" marks.

FIGS. 11 to 16 are alignment charts at respective gear positions showing relationship among rotation speed ratios of gear elements of both planetary gear sets to the input shaft 10. In these FIGS. 11 to 16, gear elements of each planetary gear set are positioned horizontally corresponding to gear ratio of the planetary gear set, and vertical axes represent rotation speed ratio of the relevant gear elements respectively. The charts of FIGS. 11 to 16 are drawn based on the fact that, since the relationship of the rotation speeds of the sun gear, the pinion carrier and the internal ring gear in each planetary gear set has linear relationship depending on gear ratio of the sun gear teeth number and the ring gear teeth number, the rotation speed ratios of respective gear elements can be directed to the intersections of a single straight line extending across the vertical axes and these vertical axes.

As can be seen from FIGS. 11 to 16, at all of the forward gear positions, no gear elements is driven in the opposite direction with respect to the input shaft. Also, as can be seen from FIG. 15, at the fifth gear position, i.e., at the most frequently used highest (over-drive) speed ratio, only the second internal ring gear R2 which serves as the output gear element, rotates at higher speed than the input shaft 10. At this fifth gear position, no gear elements except for the second internal ring gear R2 is driven at a higher speed than the input shaft 10. In addition, at the fifth gear position, the first planetary gear set G1 is held at idling condition and is not effective for power transmission. Therefore, only the second planetary gear set G2 is active for power transmission.

As set forth, in the shown embodiment, since no gear elements will rotate at high speed or cause relative rotation at high speed, frictional resistance at the clutches and brakes can be reduced substantially and thus can enhance power transmission efficiency. Furthermore, since power transmission is effected only through the second planetary gear set at the fifth gear position which is frequently used in the normal driving behavior, gear noise can be reduced and power transmission efficiency can be further enhanced.

In the shown embodiment, the fourth gear position can be established only by engaging the fourth clutch C4 to directly connect the input shaft and the output shaft, so that, it is not essential to engage the second brake B2. However, if the second brake B2 is held to be engaged, 3–4 up-shift gear-change operation and 4–5 up-shift gear-change operation can be performed by releasing only one clutch or brake, and by engaging only one clutch or brake. This simplifies the gear-change operation and thus makes it easier.

The fourth gear position also can be established by engaging two of the first clutch C1, the second clutch C2 and the third clutch C3 as shown in FIG. 10 by "(4th)". This alignment chart at the fourth gear position in this case is illustrated in FIG. 17.

FIG. 18 shows the second embodiment of the planetary gear type transmission mechanism according to the invention. In this embodiment, the arrangements of the second clutch C2, the third clutch C3, the fourth clutch C4, the second brake B2 and the third brake B3 are modified from that in the foregoing first embodiment. Relative connections among all of the constructional elements, however, are essentially the same as that in the foregoing first embodiment. Accordingly, the second embodiment can operate substantially in the same manner as the first embodiment and can attain the same frictional effects.

Figure 21:
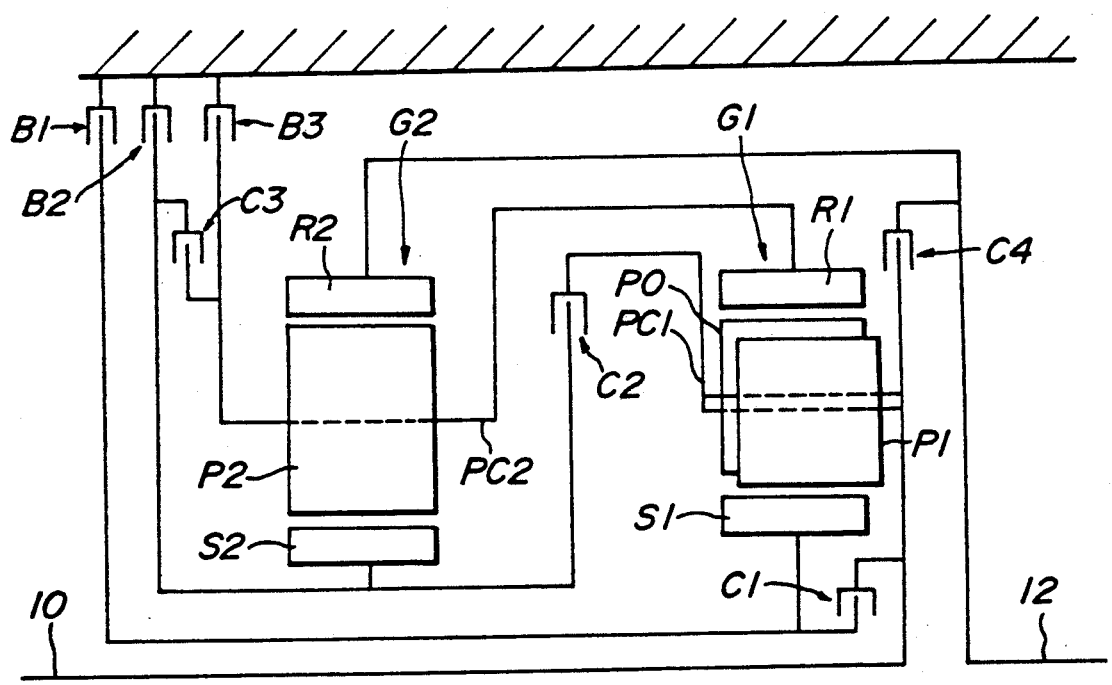
FIG. 21 is a skeleton diagram showing the fifth embodiment of the planetary gear type transmission mechanism according to the invention.

FIGS. 19, 20 and 21 respectively show the third, fourth and fifth embodiments of the planetary gear type transmission mechanism of the invention. Also in these embodiments, only arrangements of some clutches and brakes are modified with maintaining essential connections among all of the constructional elements similar to the foregoing first embodiment. Accordingly, substantially the same function as that of the first embodiment can be obtained.

Figure 22:
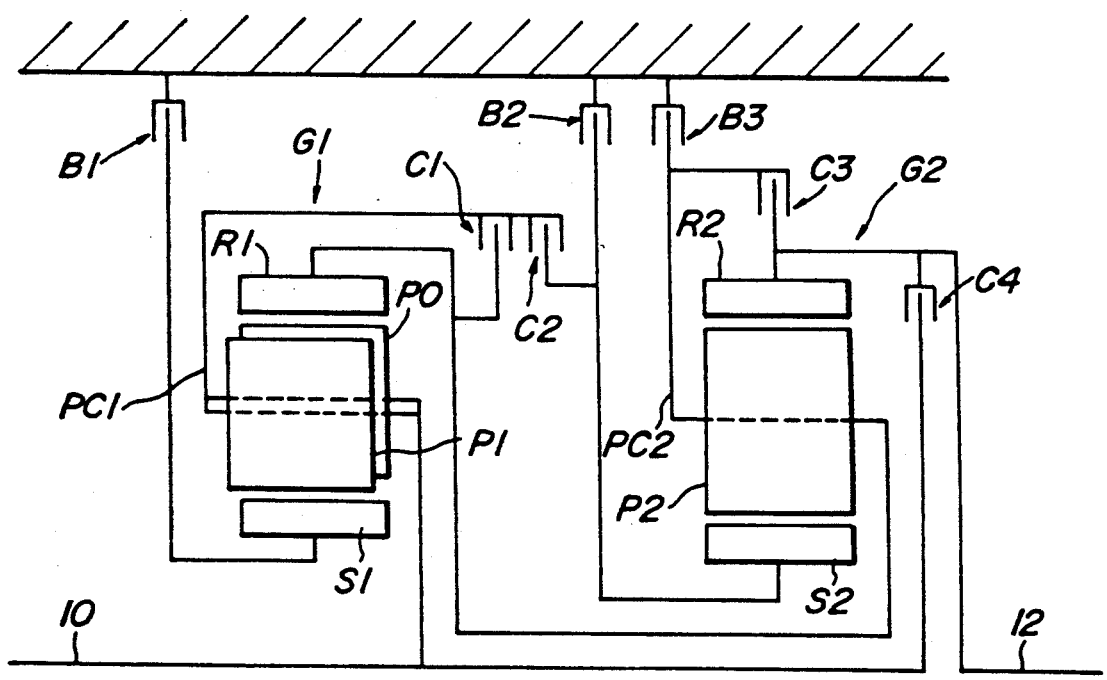
FIG. 22 is a skeleton diagram showing the sixth embodiment of the planetary gear type transmission mechanism according to the invention.
Figure 23:
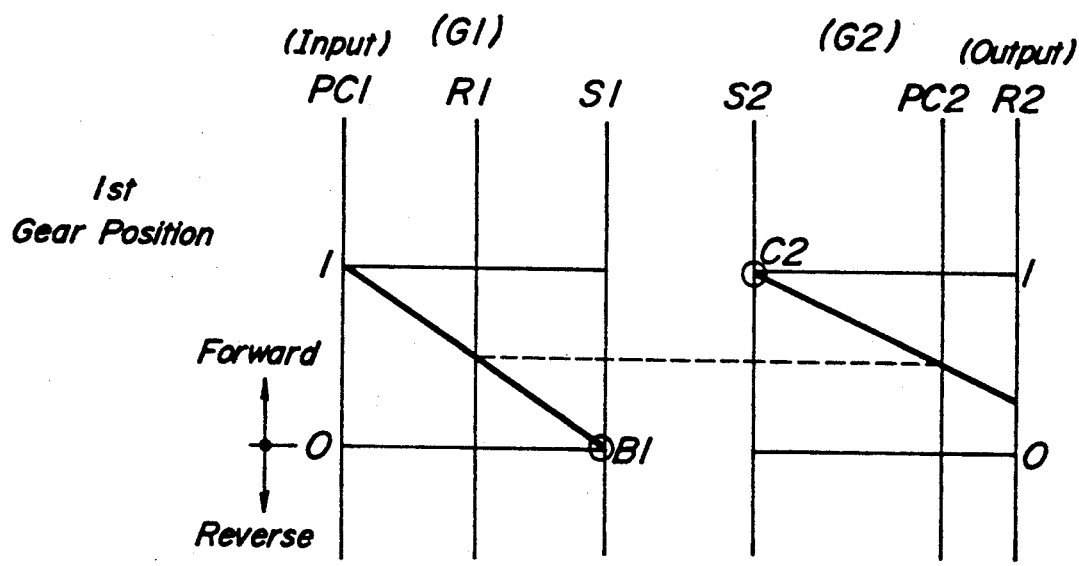
FIG. 23 is an alignment chart for the sixth embodiment of the planetary gear type transmission mechanism at the first gear position.
Figure 24:
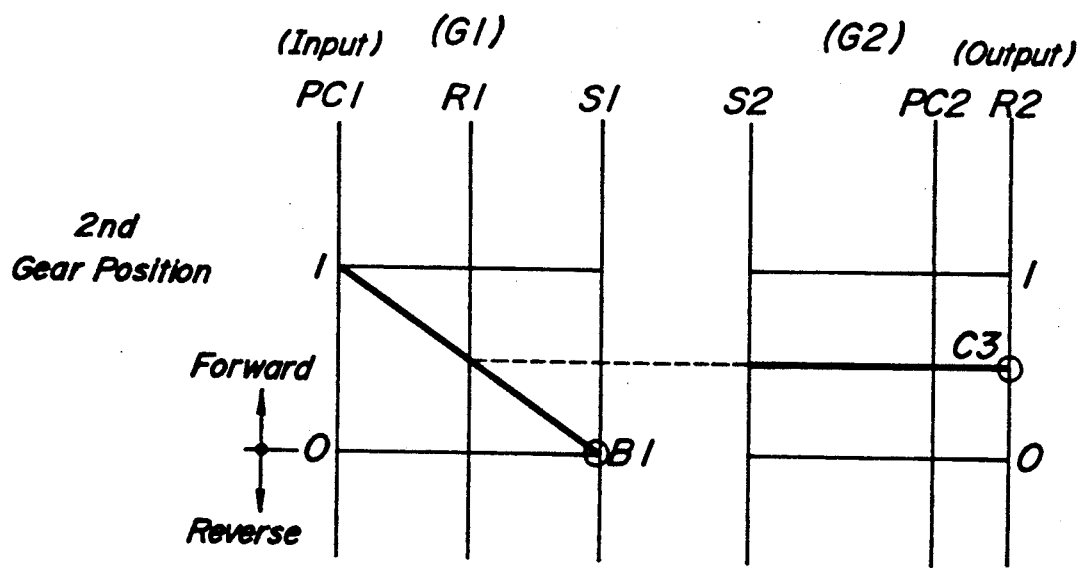
FIG. 24 is an alignment chart for the sixth embodiment of the planetary gear type transmission mechanism at the second gear position.
Figure 25:
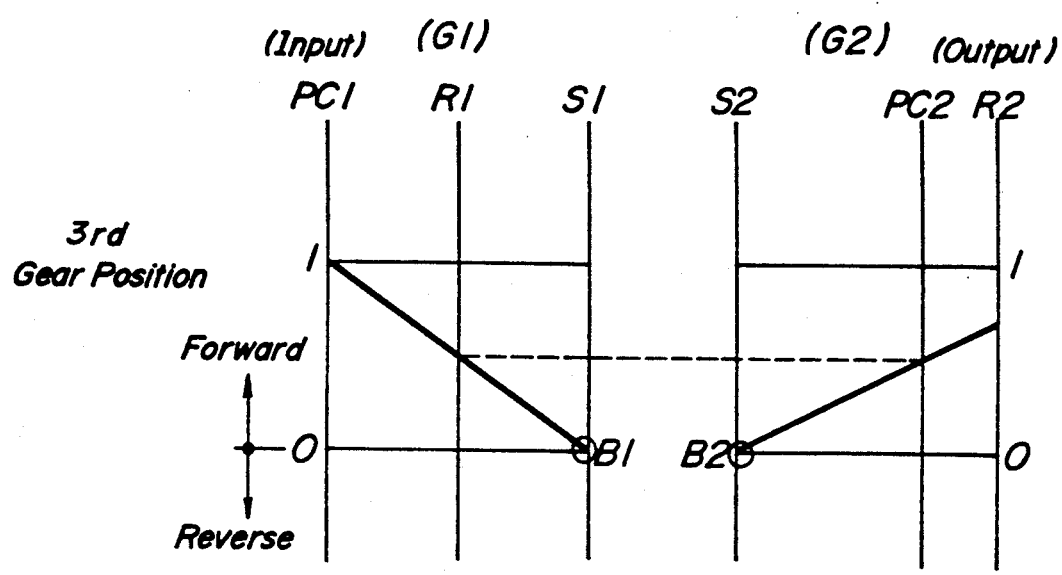
FIG. 25 is an alignment chart for the sixth embodiment of the planetary gear type transmission mechanism at the third gear position.
Figure 26:
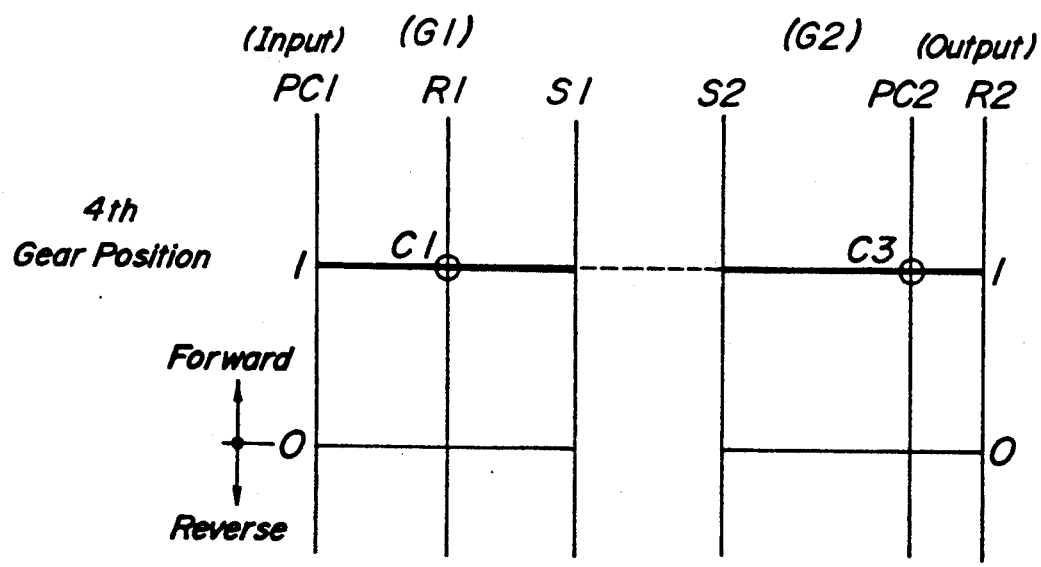
FIG. 26 is an alignment chart of the sixth embodiment of the planetary gear type transmission mechanism at the fourth gear position

FIG. 22 shows the sixth embodiment of the planetary gear type transmission mechanism of the invention. In this embodiment, the first clutch C1 and the third clutch C3 are adapted to connect and disconnect the different gear elements to each other. Namely, the first clutch C1, in this embodiment, is adapted to connect and disconnect the unity of the input shaft 10 and the first pinion carrier PC1 to and from the unity of the first internal ring gear R1 and the second pinion carrier PC2. Moreover, the third clutch C3 is adapted to connect and disconnect the unity of the first internal ring gear R1 and the second pinion carrier PC2 to and from the unity of the output shaft 12 and the second internal ring gear R2.

The alignment chart at each gear position for the sixth embodiment of the planetary gear type transmission mechanism is illustrated in FIGS. 23 to 28. As can be appreciated from these figures, also in this embodiment, substantially the same effects as those in the first embodiment can be obtained. It should be noted that, though in the shown embodiment both of the first clutch C1 and the third clutch C3 are altered from the first embodiment, only one of either the first clutch C1 and the third clutch C3 may be altered to obtain the same effects.

Figure 29:
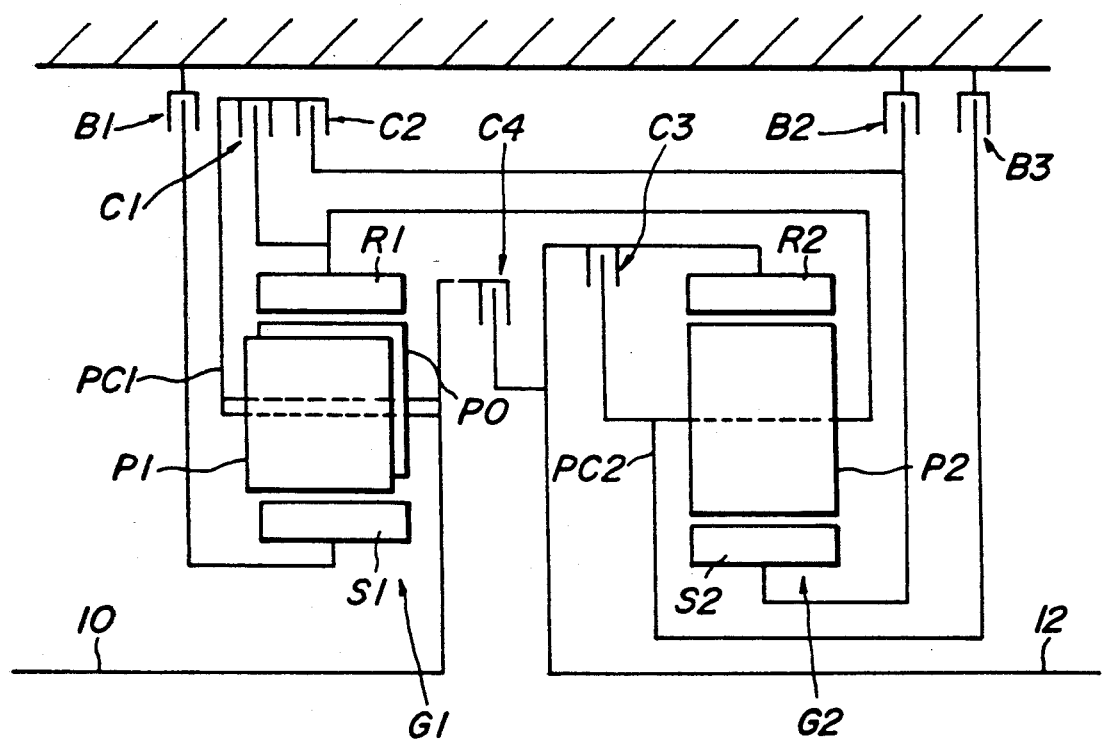
FIG. 29 is a skeleton diagram showing the seventh embodiment of the planetary gear type transmission mechanism according to the invention.

FIG. 29 shows the seventh embodiment of the planetary gear type transmission mechanism according to the invention. The seventh embodiment is realized by modifying arrangement of the first clutch C1, the second clutch C2, the third clutch C3, the fourth clutch C4, the second brake B2, and the third brake B3 from the sixth embodiment. The relative connections of the constructional elements, however, are essentially the same as that in the foregoing sixth embodiment and thus can obtain substantially the same effects.

Figure 30:
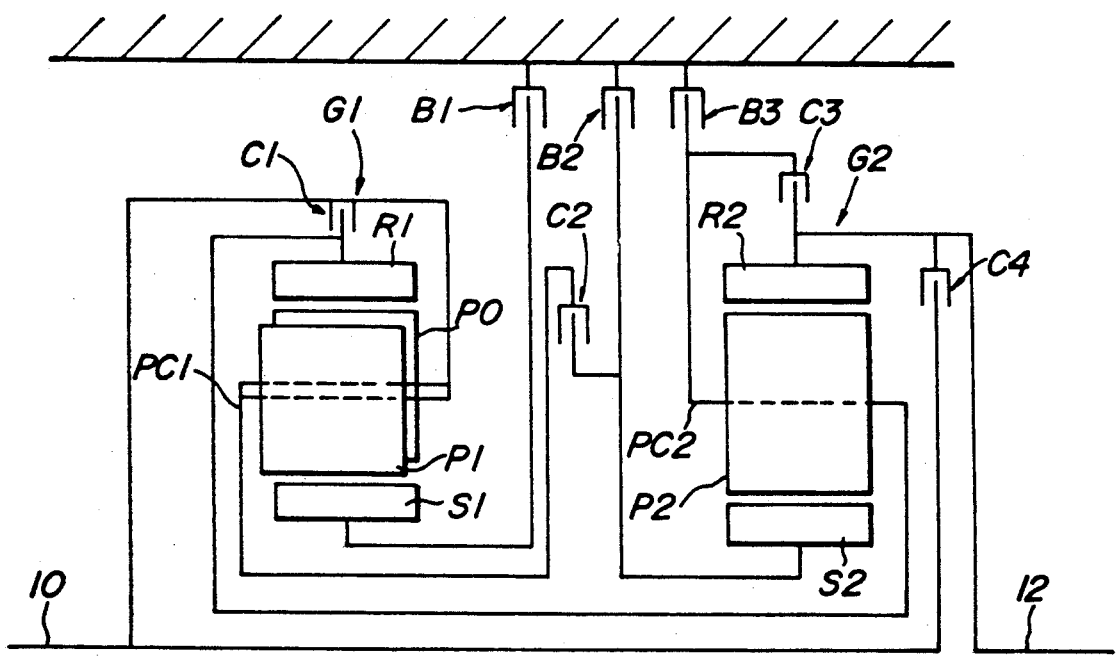
FIG. 30 is a skeleton diagram showing the eighth embodiment of the planetary gear type transmission mechanism according to the invention.
Figure 31:
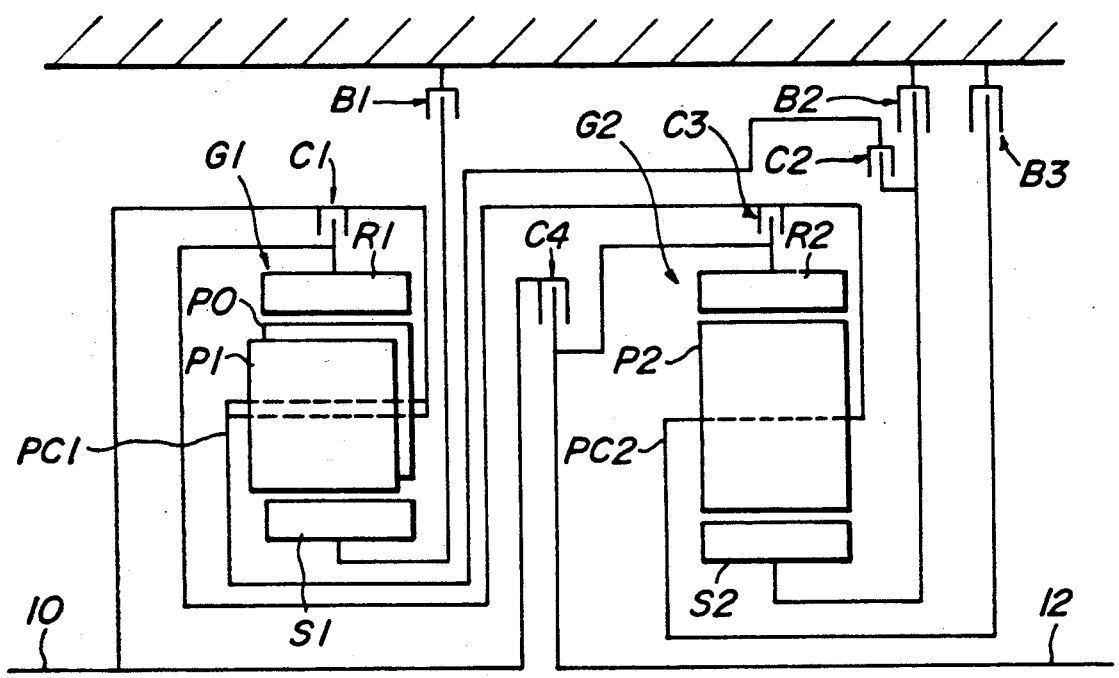
FIG. 31 is a skeleton diagram showing the ninth embodiment of the planetary gear type transmission mechanism according to the invention.
Figure 32:
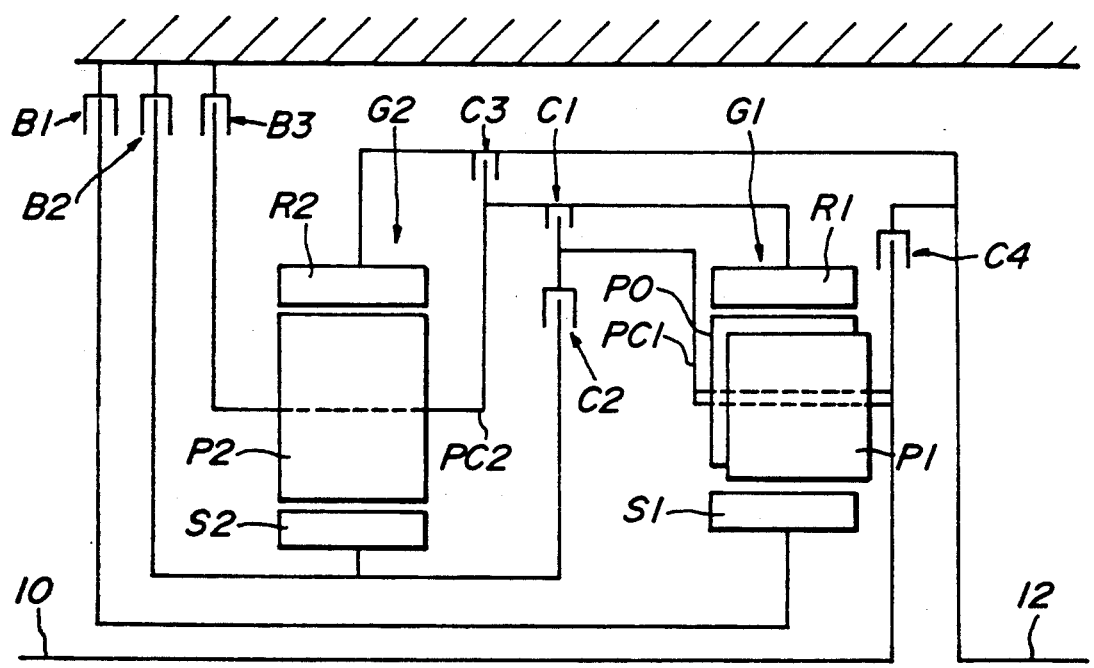
FIG. 32 is a skeleton diagram showing the tenth embodiment of the planetary gear type transmission mechanism according to the invention.

FIGS. 30, 31 and 32 respectively show the eighth, ninth and tenth embodiments of the planetary gear type transmission mechanisms according to the present invention. These embodiments are realized with only modified arrangements of the clutches and brakes. Therefore, relative connections of the constructional elements are essentially the same as that in the foregoing sixth embodiment, and thus it can provide the substantially the same effects.

Figures 33, 34:
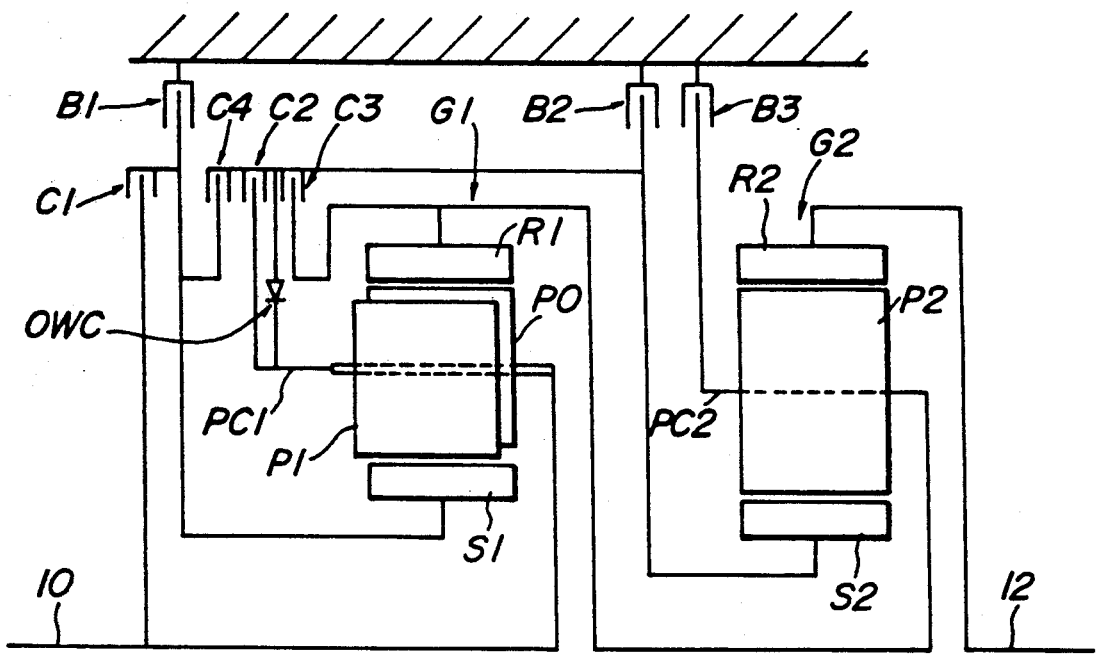
FIG. 33 is a skeleton diagram showing the eleventh embodiment of the planetary gear type transmission mechanism according to the invention.
FIG. 34 is a table showing relationship between elements to be engaged and gear positions established thereby in the eleventh embodiment of the planetary gear type transmission mechanism.
Figure 35:
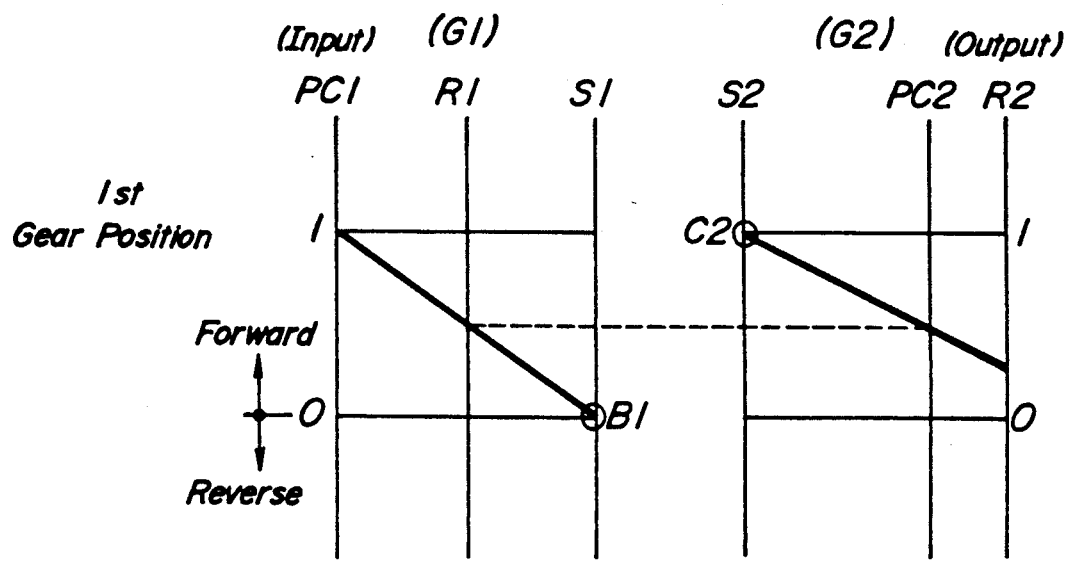
FIG. 35 is an alignment chart for the eleventh embodiment of the planetary gear type transmission mechanism at the first gear position.
Figure 36:
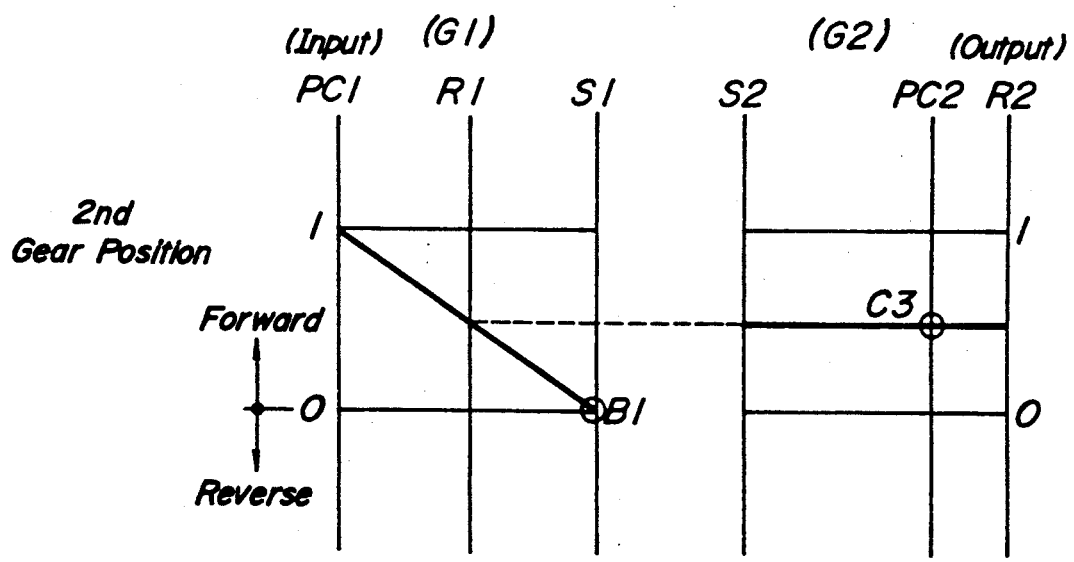
FIG. 36 is an alignment chart for the eleventh embodiment of the planetary gear type transmission mechanism at the second gear position.
Figure 39:
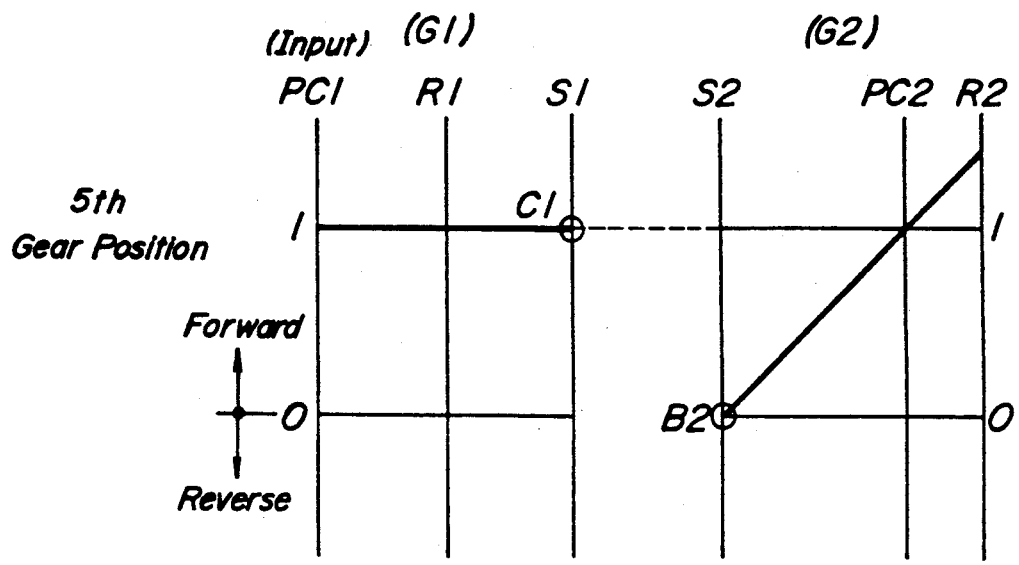
FIG. 39 is an alignment chart for the eleventh embodiment of the planetary gear type transmission mechanism at the fifth gear position.
Figure 40:
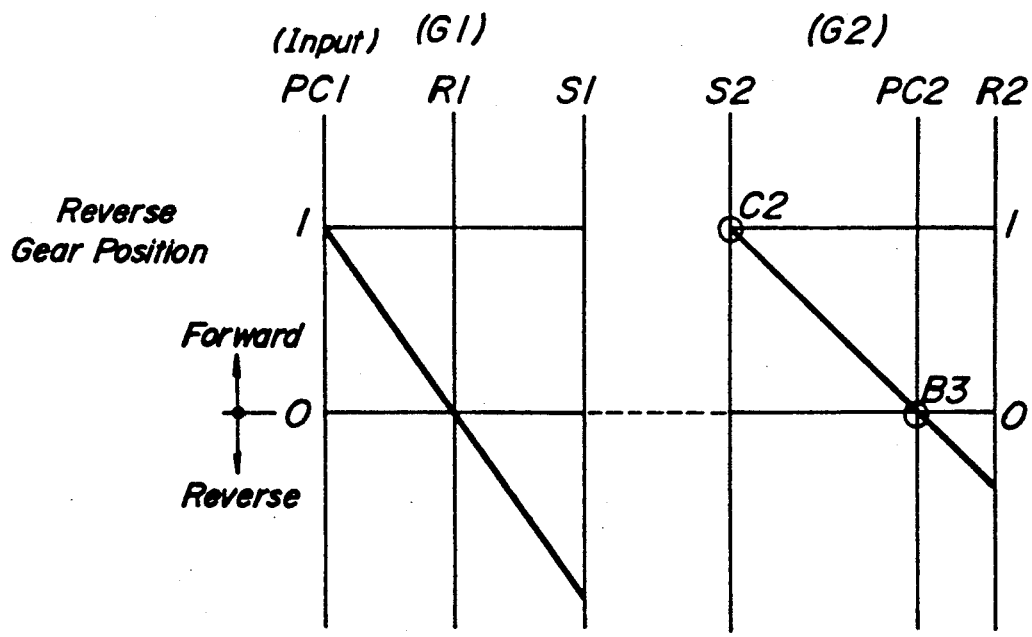
FIG. 40 is an alignment chart for the eleventh embodiment of the planetary gear type transmission mechanism at the reverse gear position.

FIG. 33 shows the eleventh embodiment of the planetary gear type transmission mechanism according to the invention. In this embodiment, the gear elements to be connected and disconnected to each other by the fourth clutch C4 are altered from the first embodiment. In addition, a one-way clutch OWC is provided in series with the second clutch C2. In this embodiment, the fourth clutch C2 is altered to connect and disconnect the first sun gear S1 and the second sun gear S2.

With the arrangement of the eleventh embodiment, the relationship of friction elements to be engaged and gear positions established thereby is as shown in FIG. 34. At each gear position, gear elements rotate with the relationship illustrated in FIGS. 35 to 40. As appreciated from these figures, also in the eleventh embodiment substantially the same effect as in the first embodiment can be obtained. In addition, since the shown embodiment incorporates the one-way clutch OWC, 1-2 up-shift gear-change operation is performed easily by free-running of the one-way clutch OWC.

Furthermore, in this embodiment, the required torque capacities of the fourth clutch C4 and the second brake B2 can be made smaller than those in the first embodiment. Namely, regarding of the fourth clutch C4, it has to transmit overall torque of the input shaft 10 only by itself in the first embodiment, however in the eleventh embodiment, part of the input shaft torque is loaded also on the first clutch C1 so that the required torque capacity of the fourth clutch C4 will be approximately 60% of that in the first embodiment. Also regarding the second brake B2, it has to be engaged at the third gear position as well as the fifth gear position in the first embodiment, however, in the eleventh embodiment, the second brake is to be engaged only at fifth gear position so that the required torque capacity of the second brake becomes approximately one half of that in the first embodiment.

It should be appreciated that such modification relative to the fourth clutch C4 and the addition of the one-way clutch OWC are applicable for any of the foregoing embodiments.

As set forth above, according to the present invention, the gear elements which rotate in the opposite direction to the input shaft at any forward gear position, can be successfully avoided. Also, at the frequently used highest gear position, no gear element except for the output element will be driven at higher speed than the input shaft. As a result, frictional resistance of the clutches and brakes can be reduced and thus improve the power transmission efficiency. Elimination of the gear elements rotating at high speed contributes to strength and cheap construction. Furthermore, since only one planetary gear set is active at the highest gear position, gear noise can be suppressed and power transmission efficiency can be more enhanced.

What is claimed is:

1. A planetary gear type transmission mechanism comprising:
   (a) an input member to be supplied rotation from a power supply;
   (b) an output member for delivering rotation changed in speed at an selected speed ratio;
   (c) a first gear set including a gear element constantly coupled with said input member for rotation therewith;
   (d) a second gear set including a gear element constantly coupled with said output member for rotation therewith; and
   (e) friction means including a plurality of friction elements for determining power transmission route through at least one of said first and second gear sets for establishing a plurality of speed ratios between the input and output members;

other gear elements of the first and second gear sets being coupled with each other and the friction elements being arranged, in such manner that all gear elements of the first and second gear sets except for said gear element constantly coupled with the output member rotates in the same direction as that of the input member at speed less than the input member upon selection of any forward speed ratio.

2. A planetary gear type transmission mechanism as set forth in claim 1, wherein the highest speed ratio of said forward speed ratios is established in such manner that said second gear set is exclusively active for transmitting rotation of the input member to the output member.

3. A planetary gear type transmission mechanism as set forth in claim 2, wherein said the highest speed ratio is established by connection between said gear element of the first gear set constantly coupled with said input member and any one of gear elements of said second gear set for direct power transmission of the input rotation to the second gear set.

4. A planetary gear type transmission mechanism as set forth in claim 1, wherein said first gear set is a double pinion type planetary gear set.

5. A planetary gear type transmission mechanism as set forth in claim 1, wherein said second gear set is a single pinion type planetary gear set.

6. A planetary gear type transmission mechanism as set forth in claim 4, wherein said second gear set is a single pinion type planetary gear set.

7. A planetary gear type transmission mechanism as set forth in claim 4, wherein said first gear set comprises a first sun gear, a first internal ring gear, a first outer planet pinion gears and a first inner planet pinion gears meshed with each other, and a first pinion carrier rotatably supporting said first outer planet pinion gears and said first inner planet pinion gears, said first outer planet pinion gears meshing with said first internal ring gear, said first inner planet pinion gears meshing with said first sun gear, and said first pinion carrier being constantly coupled with said input member.

8. A planetary gear type transmission mechanism as set forth in claim 5, wherein said second gear set comprises a second sun gear, a second internal ring gear, a second planet pinion gears each meshing with both of said second sun gear and said second internal ring gear, and a second pinion carrier rotatably supporting said second planet pinion gears, and said second internal ring gear is constantly coupled with said output member.

9. A planetary gear type transmission mechanism as set forth in claim 6, wherein said first gear set comprises a first sun gear, a first internal ring gear, a first outer planet pinion gears and a first inner planet pinion gears meshed with each other, and a first pinion carrier rotatably supporting said first outer planet pinion gears and said first inner planet pinion gears, said first outer planet pinion gears meshing with said first internal ring gear, said first inner planet pinion gears meshing with said first sun gear, and said first pinion carrier being constantly coupled with said input member,
said second gear set comprises a second sun gear, a second internal ring gear, a second planet pinion gears each meshing with both of said second sun gear and said second internal ring gear, and a second pinion carrier rotatably supporting said second planet pinion gears, said second internal ring gear being constantly coupled with said output member, and said second pinion carrier constantly coupled with said first internal ring gear.

10. A planetary gear type transmission mechanism as set forth in claim 9, wherein said friction means comprises first, second, third and fourth clutches and first, second and third brakes, said first clutch connects and disconnects the unity of said input member and said first pinion carrier to and from said first sun gear for selected speed ratio, said second clutch connects and disconnects the unity of said input member and said first pinion carrier to and from said second sun gear for selected speed ratio, said third clutch connects and disconnects the unity of said first internal ring gear and said second pinion carrier to and from said second sun gear for selected speed ratio, said fourth clutch connects and disconnects the unity of said input member and said first pinion carrier to and from the unity of said output member and said second internal ring gear for selected speed ratio, said first brake connects and disconnects said first sun gear to and from a stationary member for selected speed ratio, said second brake connects and disconnects said second sun gear to and from the stationary member for selected speed ratio, and said third brake connects and disconnects the unity of said second pinion carrier and said first internal ring gear to and from the stationary member for selected speed ratio.

11. A planetary gear type transmission mechanism as set forth in claim 10, wherein said first clutch is altered to connect and disconnect the unity of said input member and said first pinion carrier to and from the unity of said first internal ring gear and said second pinion carrier for the selected speed ratio.

12. A planetary gear type transmission mechanism as set forth in claim 10, wherein said third clutch is altered to connect and disconnect the unity of said first internal ring gear and said second pinion carrier to and from the unity of said output member and said second internal ring gear for the selected speed ratio.

13. A planetary gear type transmission mechanism as set forth in claim 10, wherein said fourth clutch is altered to connect and disconnect said first sun gear to and from said second sun gear for the selected speed ratio.

14. A planetary gear type transmission mechanism as set forth in claim 10, which further comprises a one-way clutch arranged in series with said second clutch.

* * * * *